United States Patent [19]

Slayden et al.

[11] Patent Number: 5,680,629

[45] Date of Patent: Oct. 21, 1997

[54] METHOD AND SYSTEM FOR PREVIEWING COMPUTER OUTPUT

[75] Inventors: Glenn Christopher Slayden, Redmond; Mark A. Consuegra, Seattle, both of Wash.

[73] Assignee: Microsoft Corporation, Redmond, Wash.

[21] Appl. No.: 372,806

[22] Filed: Dec. 23, 1994

Related U.S. Application Data

[63] Continuation of Ser. No. 987,366, Dec. 7, 1992, abandoned.
[51] Int. Cl.⁶ .................................................. G06F 3/153
[52] U.S. Cl. ........................................................ 395/789
[58] Field of Search ................................. 395/128, 139, 395/144, 145, 148, 155, 157, 161, 788, 789, 791, 779, 782

[56] References Cited

U.S. PATENT DOCUMENTS

| | | | |
|---|---|---|---|
| 4,410,958 | 10/1983 | Demke et al. | 395/157 |
| 4,532,605 | 7/1985 | Waller | 395/139 |
| 4,893,258 | 1/1990 | Sakuragi | 395/139 |
| 4,974,176 | 11/1990 | Buchner et al. | 395/128 |
| 5,001,697 | 3/1991 | Torres | 395/157 |
| 5,014,222 | 5/1991 | Donahue | 395/155 |
| 5,029,114 | 7/1991 | Makiguchi | 395/145 |
| 5,187,776 | 2/1993 | Yanker | 395/139 |
| 5,227,771 | 7/1993 | Kerr et al. | 395/157 |
| 5,253,338 | 10/1993 | Tanaka | 395/139 |
| 5,263,134 | 11/1993 | Paal et al. | 395/155 |
| 5,276,796 | 1/1994 | Yamada et al. | 395/145 |
| 5,278,952 | 1/1994 | Kira et al. | 395/145 |
| 5,287,445 | 2/1994 | Kataoka et al. | 395/155 |
| 5,302,967 | 4/1994 | Yonezawa et al. | 395/139 |
| 5,307,086 | 4/1994 | Griffin et al. | 395/155 |

OTHER PUBLICATIONS

Alfieri, "The Best Book of : WordPerfect Version 5.0", Hayden Books (1988), pp. 93–95.
Mendelson, "WordStar", PC Magazine (Dec. 11, 1990), pp. 188, 191, and 192.
Davidson, "Beyond Text Editing", Lotus, vol. 6 No. 4 (Apr. 1990), pp. 92–96.
Kinata, "Working With Word", Microsoft Press (1989), pp. 15, 16, 27–29, and 464–470.
Microsoft Powerpoint Version 3.0 (Trademark of Microsoft Corporation), 1992, Screen display pp. 1–11.
Microsoft Windows User's Guide (Trademark of Microsoft Corporation), 1990, pp. 18, 21–22 & 47–48.
"Print Preview: See Results Before You Print", *Microsoft Word User's Guide*, 1991, Chapter 24, pp. 447–450.
"Reduced Size/Actual Size and Side By Side", *Claris MacWrite II User's Guide*, 1989, pp. 5–65–5–66.

*Primary Examiner*—Mark K. Zimmerman
*Assistant Examiner*—Cliff N. Vo
*Attorney, Agent, or Firm*—Seed and Berry LLP

[57] ABSTRACT

A method and system for previewing computer output is provided. In a preferred embodiment of the present invention, the computer output is previewed in a preview area. The computer output has several elements, or pages, arranged in rows and columns. A magnification factor is calculated that is directly related to one of the dimensions of the preview area and inversely related to either the sum of the vertical dimensions of the elements in one of the columns or the sum of the horizontal dimensions of the elements in one of the rows. At least a portion of the computer output is selected for display. The selected portion of the computer output is then displayed in the preview area at the calculated magnification factor.

25 Claims, 28 Drawing Sheets

ARBOR REPORT

Vol. II • No. 12 • 5/18/94

| Foot Facts | Production statistics for the month: | |
|---|---|---|
| The children's shoe division walked away with this month's production award exceeding their production goal by 7%! | Athletic shoes | 2,745 |
| | Children's shoes | 3,790 |
| | Men's dress shoes | 1,084 |
| | Women's dress shoes | 1,200 |

Robot added to work force

Our athletic shoe division took a step toward the twenty-first century this month when it purchased a robot to assist with manufacturing.

The robot threads shoelaces into track shoes at an alarming rate of speed. Human co-workers report that the robot is pleasant to work with and "doesn't complain much." In fact, the robot doesn't talk at all.

Nicknamed "TongueTied" by his co-workers, the 5'6" tall robot was originally programmed to whistle as he worked. Fellow workers soon voted to shut off this function. Does TongueTied make any noise at all now? Supervisor Paul Martin reports, "At the end of the day his hydraulic system decompresses and he sort of sighs."

For Martin's fortieth birthday, workers dressed the robot in a company T-shirt and a party hat. It gave TongueTied so much personality that Martin left him that way.

Autographs, Anyone?

TongueTied, our company robot, seems to have a competitive side to him. As a publicity gimmick, Marketing entered him in a nationwide computer games contest last week. Along with 1200 kids, ages 9 to 14, TongueTied competed for top scores on arcade-type computer games. TongueTied rolled away with not only top honors, but the world record score for all three of the games.

While all prizes went to the humans, the company sponsoring the contest created a special plaque for TongueTied to commemorate the win. As for his competitors, the kids had nothing but admiration for his quick reflexes.

As top scorer in the contest, TongueTied's name will appear in arcades across the world, along with the names of the top five humans. Marketing modified its sales strategy for our juvenile athletic footwear to capitalize on the new-found celebrity status. Marketing director Veronique Caspary announced in a televised press conference yesterday that TongueTied will soon begin autographing each pair of high-tech track shoes that he laces.

Will celebrity status change our mild-mannered TongueTied? He already lost a day of work while he practiced his signature. Programmers say his natural writing is "rather flamboyant." They're trying to tone it down to fit on the side of a shoe.

Employee News

Soccer Team Wins!

Congratulations to the Arbor Shoes soccer team! It took first place in the recent city competition. And special thanks to team captain Bruno Martin, from our manufacturing division, who told a TV reporter, "great shoes are part of a sound strategy."

Writing contest winner

Benedicte Selva took second place in the city's humorous essay contest. Co-workers encouraged her to write down the stories she tells on break time. Her winning story, "I wasn't born to ski," was their all-time favorite, told while they were signing the cast on her leg.

Wedding bells

Best wishes to Thomas Bendel (women's dress shoes division) and Isabelle Mendel (administration), who tied the knot last Friday night. For fun, co-workers prepared a hyphenated name plate for Isabelle's office door. It reads: "Dr. Isabelle Mendel-Bendel."

New baby

Arbor Shoes delivered our traditional welcome-to-the-world booties to celebrate the birth of Jean Loren. The proud parents are Bernard and Helene Loren (men's dress shoes division).

On the Move

Facilities reports that our new administration wing is almost complete. The sound of hammering has finally given way to the dull thumps of the carpet layers. By the first of next month, departments should be relocated as indicated on the map.

Small Volunteers Needed

We need babies less than a year old to home test our experimental Polar Baby Booties. Anne Gabor in our research department reports, "Our goal is to keep their tootsies toasty to 40 below." Contact Anne if you know of a small, barefoot volunteer.

Figure 1

METHOD AND SYSTEM FOR PREVIEWING COMPUTER OUTPUT

CROSS-REFERENCE TO RELATED APPLICATION

This application is a continuation U.S. patent application Ser. No. 07/987,366, filed Dec. 7, 1992, now abandoned.

TECHNICAL FIELD

The invention relates generally to a method and system for previewing computer output, and, more specifically, to a method and system for presenting a representation of a multi-dimensional array of printed pages on a display device connected to a computer.

BACKGROUND OF THE INVENTION

Computers are frequently used to generate documents that, when complete, are printed on paper using attached printing devices. For a variety of reasons, it is often difficult to discern exactly how such documents will look when printed without actually printing them. The most prominent reason is that, for a computer user to manipulate a document during generation, detailed elements within the document must be displayed large enough for the user to be able see and alter them. As a result, during generation, the display is filled with a small portion of the document, which is out of context with the remainder. Further, during generation, because of display resolution and processing time constraints, a document is sometimes displayed in a different format than the format in which it will later be printed.

FIGS. 1 and 2 illustrate differences between a printed document and its display image during generation. FIG. 1 is a document generated using Microsoft Word for Windows in final printed form. It shows a newspaper-style masthead 104, columns 105–107, and text sections 108–109. FIG. 2 is a display image of the same document during generation. It shows borders 201–203, columns 205, and a text section 208. The display is different from the printed page in a number of ways: 1) It shows borders 201–203, not present in the printed document. 2) It does not show masthead 104 of the printed document. 3) It does not show columns 106 and 107 of the printed document. 4) It does not show section 109, nor columns 106–107 of the printed document. 5) Page breaks are shown as dotted horizontal lines, not separate pages.

To allow their users to ascertain what documents will look like when actually printed, some application programs include either a "page preview" feature or a "reduced size" feature. The page preview feature presents one or two pages of the document in the same format in which it will be in when printed. The reduced size feature allows the user to generate the document at a lower than normal magnification factor, permitting more of the document to be displayed at once.

FIGS. 3–4 are display images illustrating an implementation of the page preview feature. FIG. 3 is a display image illustrating an implementation of the page preview feature. It shows a page of the document from FIG. 1, including a newspaper-style masthead 304, columns 305–307, and text sections 308–309. Implementations of the page preview feature display the entire page, as it will look when printed, theoretically allowing a user to see the context that a section of text will appear in, as well as the overall alignment of sections of the page. However, because of the low resolution of currently available display devices, displaying the entire page makes most of the text illegible.

Further, when running in an environment in which applications' output is displayed in resizable windows, implementations of page preview do not adjust the magnification factor at which they display a page in response to window resizing, limiting the fraction of each page that can be examined using page preview. FIG. 4 is a display image illustrating an implementation of the page preview feature with window size reduced. It shows a first window 401, in which an application is displaying a page 402 of a document in page preview mode. The first window has been resized to accommodate a second window 403. As a result, the lower half of the page displayed in page preview mode in the first window is obscured. Using implementations of the page preview feature, there is no way to view the lower half of any page in a window sized as the first window is.

Also, implementations of page preview display a maximum of two pages simultaneously. This limitation causes a problem where the document generated extends significantly in two dimensions, instead of just one. Examples of such two-dimensional documents include spreadsheets, project planning charts, organizational charts, and circuit diagrams. When previewing two-dimensional documents, the simultaneous display of several pages in each dimension may be necessary to determine context.

FIGS. 5–7 are display images illustrating an implementation of the reduced size feature. FIG. 5 is a display image illustrating an implementation of the reduced size feature in "normal mode." In normal mode, the document appears in the form in which it will be printed, but only about two-fifths of a page, section 501, is visible at once. It shows part of the first page of a document during generation, which contains text section 501. FIG. 6 is a display image illustrating an implementation of the reduced size feature in reduced size mode. It shows parts of the first two pages of the same document during generation in reduced size mode, including text sections 601–603. FIG. 7 is a display image illustrating an implementation of the reduced size feature in side-by-side mode, as well as reduced size mode. It shows parts of the first three pages of the same document during generation, including text sections 701–704.

In reduced size mode, about one and one-fifth of a page, sections 601–603, are visible, and the text is somewhat legible, but certainly not clear. When not in side-by-side mode, pages appear in a vertical column. In reduced size mode and side-by-side mode, pages appear in two vertical columns, and about one and one-fifth of a page is visible in each column. A maximum of two full pages and up to four fractional pages can therefore be displayed at once, which can be inadequate for reasonably large two-dimensional documents.

Like implementations of the page preview feature, implementations of the reduced size feature do not adjust the magnification at which they display the page in response to window resizing. This limits the fraction of each page that can be examined at once using the reduced size feature.

Both the page preview feature and the reduced size feature have significant shortcomings as tools to help ascertain what a computer-generated document will look like when it is printed. Neither shows text or other page contents in a completely legible way, neither resizes the image to fit in a resized window, and neither can display more than two whole pages simultaneously on a normal display device.

SUMMARY OF THE INVENTION

It is an object of the present invention to provide a method and system for previewing computer output within a preview area.

It is another object of the present invention to provide a method and system for previewing computer output elements at actual size.

It is yet another object of the present invention to provide a method and system for previewing a multi-dimensional computer-generated document within a preview area.

It is a further object of the present invention to provide a method and system for previewing a multi-dimensional computer generated document with a constant distance between elements in each direction.

It is yet a further object of the present invention to provide a method and system for providing several modes in which to preview computer output within a preview area.

These and other objects, which will become apparent as the invention is more fully described below, are obtained by an improved method and system for previewing computer output is provided. In a preferred embodiment of the present invention, the computer output is previewed in a preview area. The computer output has several elements, or pages, arranged in rows and columns. A magnification factor is calculated that is directly related to one of the dimensions of the preview area and inversely related to either the sum of the vertical dimensions of the elements in one of the columns or the sum of the horizontal dimensions of the elements in one of the rows. At least a portion of the computer output is selected for display. The selected portion of the computer output is then displayed in the preview area at the calculated magnification factor.

BRIEF DESCRIPTION OF THE DRAWINGS

FIG. 1 is a document generated using Microsoft Word for Windows in final printed form.

DETAILED DESCRIPTION OF THE INVENTION

TABLE OF CONTENTS

I. INTRODUCTION
II. NAVIGATION CONTROLS
A. PREVIEW POSITION SELECTION CONTROLS
B. VIRTUAL WINDOW SELECTION CONTROLS
III. PREVIEW MODES
A. ZOOM MODE
B. SINGLE PAGE MODE
C. MULTIPLE PAGE MODE
IV. SOFTWARE ROUTINES
A. APPLICATION OVERVIEW
B. MESSAGE PROCESSING ROUTINES
 1. INPUT MESSAGES
  a. MOUSE MESSAGES
   i. WM_LBUTTONDOWN
   ii. WM_MOUSEMOVE
   iii. WM_LBUTTONUP
  b. KEYBOARD MESSAGES
   i. WM_SYSKEYDOWN
   ii. WM_SYSCHAR
   iii. WM_KEYDOWN
 2. OPERATING SYSTEM MESSAGES
  a. WM_CREATE
  b. WM_SIZE
  c. WM_PAINT
  d. WM_COMMAND
C. SUPPORT SUBROUTINES
 1. EnableButtons
 2. CalcLayout
V. EXAMPLE
A. Issue Preview Document Command
B. Press Multiple Page Mode Button
C. Type Zoom Button Equivalent
D. Expand Window Size
E. Click in Preview Area
F. Type Rightward Virtual Window Selection Button Equivalent
G. Press Downward Virtual Window Selection Button
H. Press Print Button

I. INTRODUCTION

The present invention provides a method and system for previewing computer output. A preferred embodiment of the present invention is a document preview facility within an application program that generates documents. In a preferred embodiment, the application program generates scheduling documents.

The facility provides a set of three preview modes: zoom, single page, and multiple page. Each mode allows the user to preview the document in a different way. In zoom mode, the facility presents a portion of an element at high magnification and allows the user to (1) scroll to see portions of the element not currently visible and (2) select different elements for display. In single page mode, the facility displays the entire element and allows the user to select different elements for display. In multiple page mode, the facility displays multiple elements at once and allows the user to scroll to see elements not currently visible.

Figure 2:
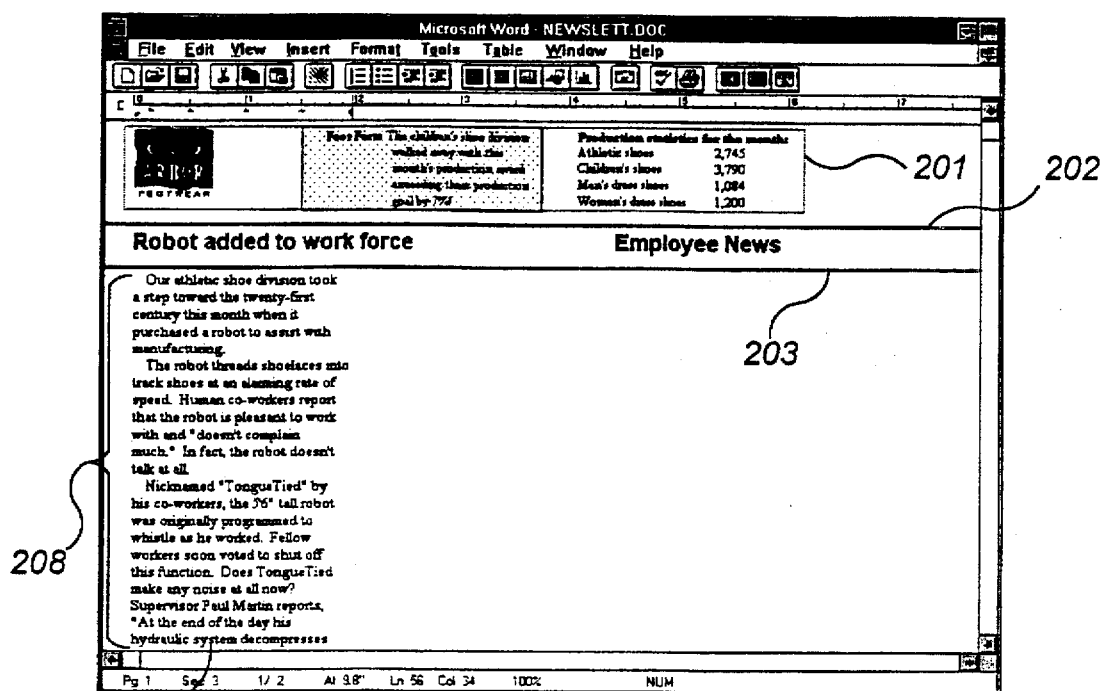
FIG. 2 is a display image of the same document during generation.
Figure 3:
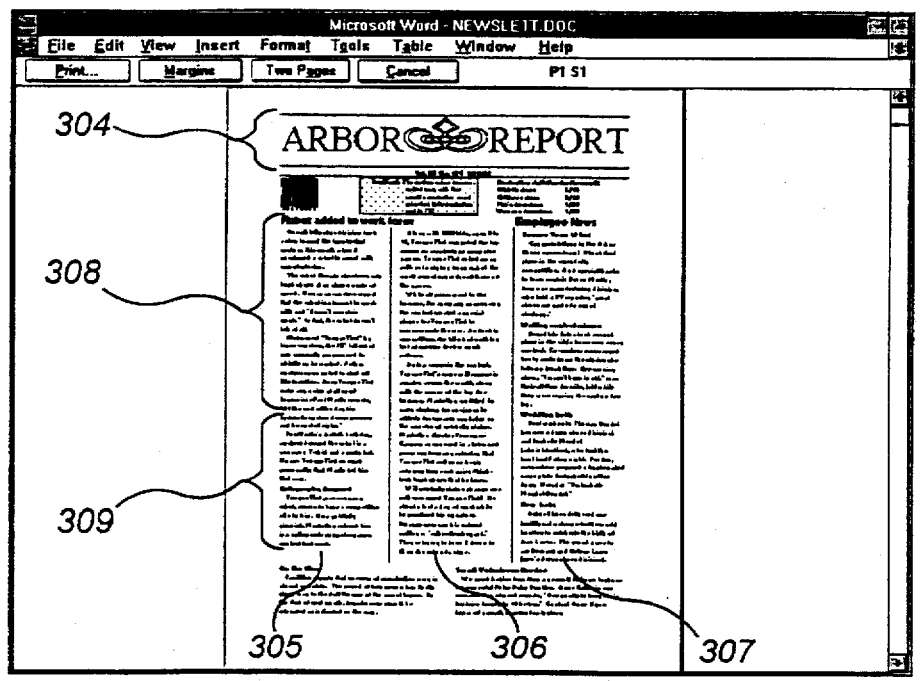
FIG. 3 is a display image illustrating an implementation of the page preview feature.
Figure 4:
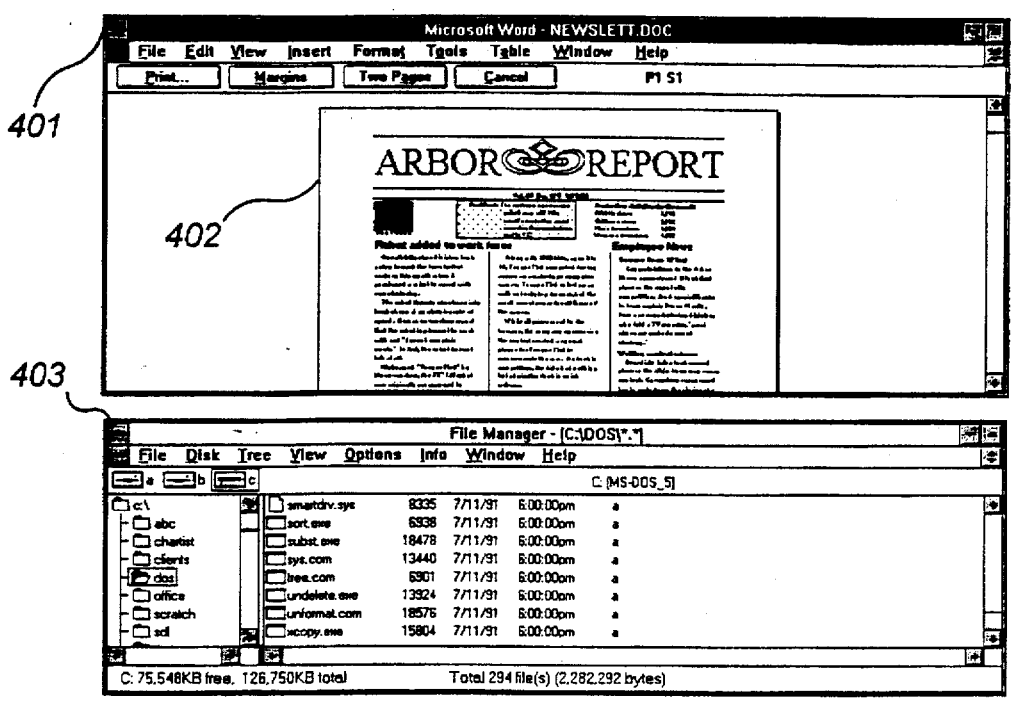
FIG. 4 is a display image illustrating an implementation of the page preview feature with window size reduced.
Figure 5:
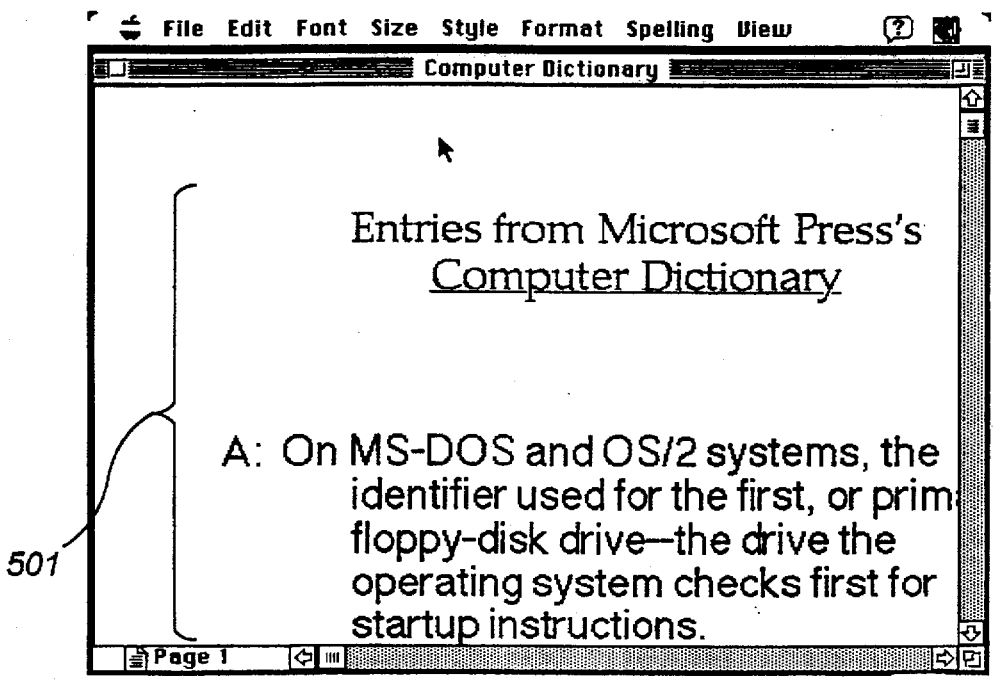
FIG. 5 is a display image illustrating an implementation of the reduced size feature in "normal mode."
Figure 6:
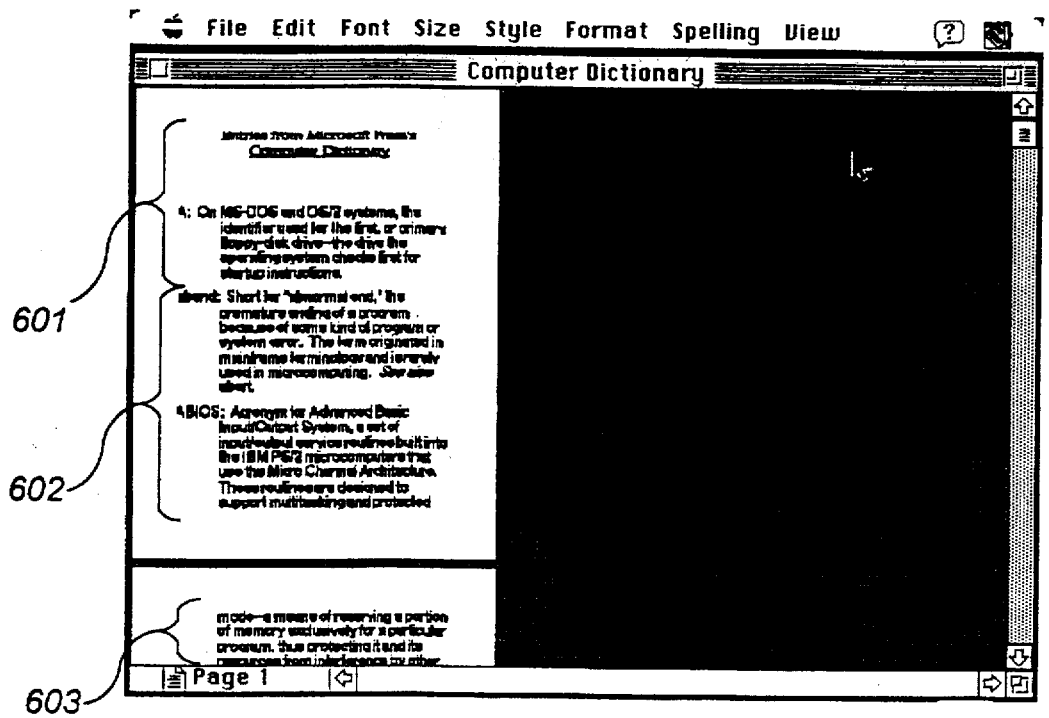
FIG. 6 is a display image illustrating an implementation of the reduced size feature in reduced size mode.
Figure 7:
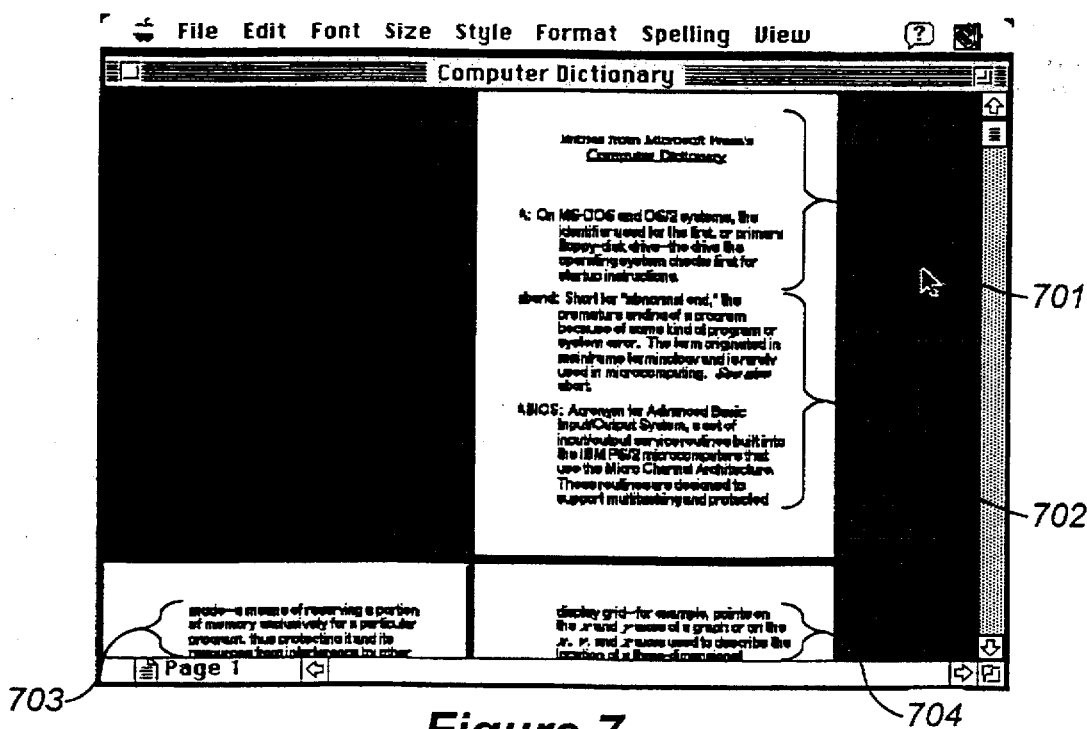
FIG. 7 is a display image illustrating an implementation of the reduced size feature in side-by-side mode, as well as reduced size mode.
Figure 8:
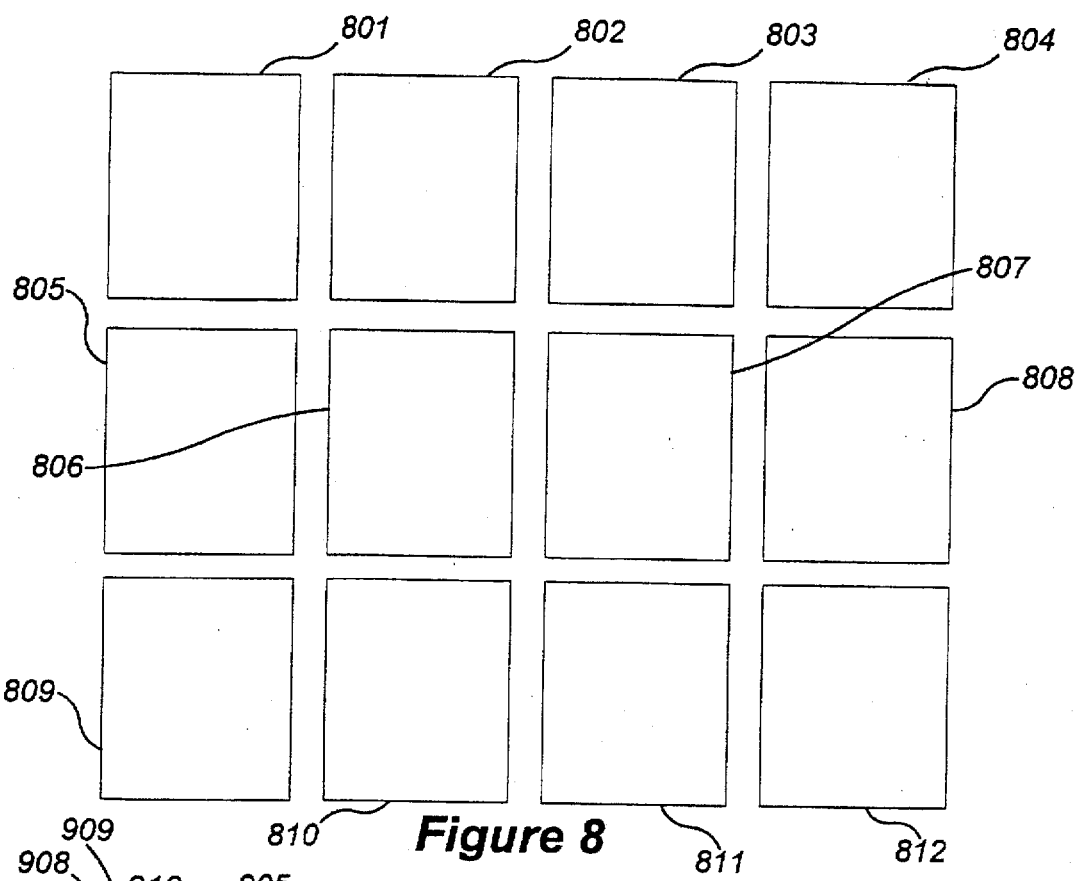
FIG. 8 is a conceptual diagram of a document.

FIG. 8 is a conceptual diagram of a document. The application program divides the document into elements 801–812. In a preferred embodiment, each element corresponds to one page of the document. For preview purposes, the facility assigns each element to a virtual window. Virtual windows are said to "contain" elements. The facility presents one virtual window at a time in the preview area, displaying as much of the virtual window contents about a display position as will fit.

The facility either assigns each element to its own virtual window, or assigns all of the elements to one virtual window. The facility also assigns a magnification factor for display of the elements. By selecting a preview mode, the user specifies the element assignment and magnification factor.

In zoom mode and single page mode, the facility assigns each element to a different virtual window. That is, the facility assigns element 801 to a first virtual window, element 802 to a second virtual window, etc. In multiple page mode, the facility assigns every element to the same virtual window. That is, the facility assigns elements 801–812 all to a first virtual window.

The currently visible virtual window is called the current virtual window. To see portions of the document not currently visible, the user manipulates navigation controls, which include preview position selection controls and virtual window selection controls. The user uses preview position selection controls to see contents of the current virtual window that are not currently visible in the preview area. The user uses virtual window selection controls to see elements of the document that are not in the current virtual window.

Figure 9:
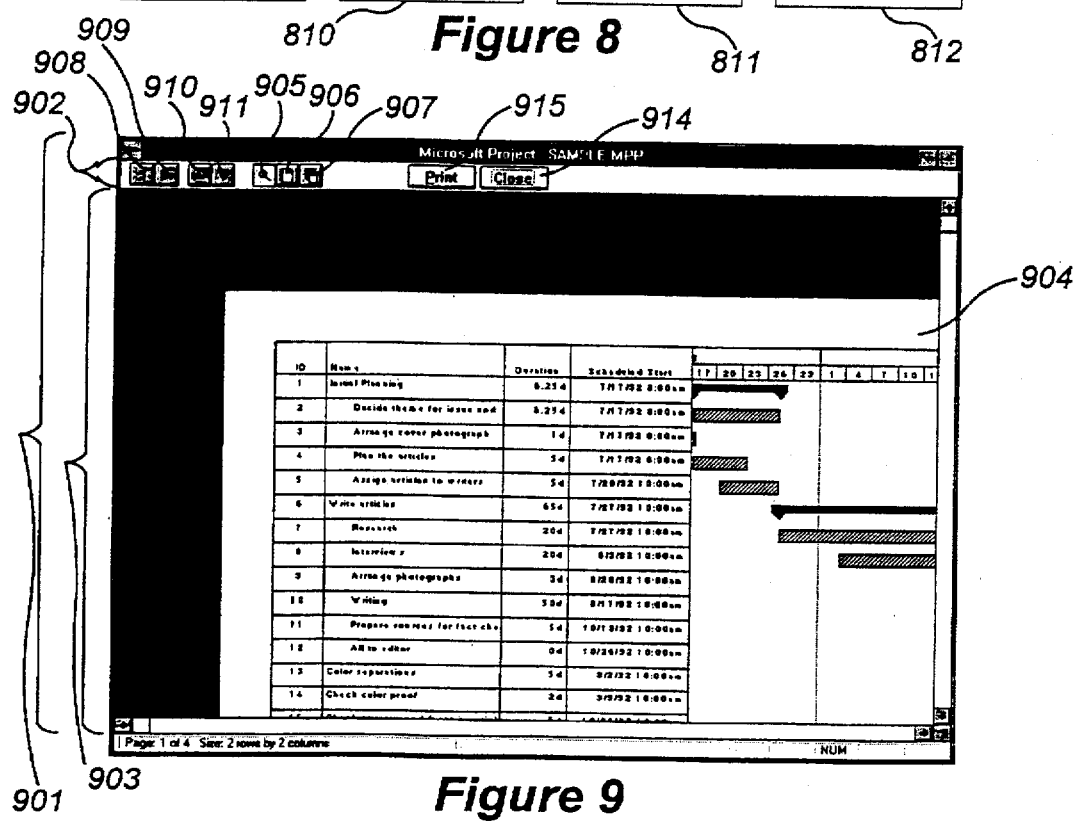
FIG. 9 is a display image that illustrates the visual interface that the facility provides to its user.

FIG. 9 is a display image that illustrates the visual interface that the facility provides. The visual interface includes a preview window 901 that comprises a control area 902, a preview area 903, and preview position selection controls 912–913. The preview area 903 contains a portion of the current virtual window 904. The control area 902 contains preview mode selection controls 905–907 and virtual window selection controls 908–911. The facility allows its user to display part or all of the contents of the current virtual window in the preview area, based on the user's manipulation of three sets of controls. The preview mode selection controls and the virtual window selection controls are each a group of display buttons in the control area. Display buttons are bounded areas on the display that are selected by using a pointing device, like a mouse, and "clicking on" the button. The preview position selection controls are horizontal and vertical scroll bars. By clicking on various parts of the scroll bars, the user can cause the facility to display different parts of the current virtual window in the preview area when the entire current virtual window is too large to fit completely within the preview area. The control area also contains two further display buttons. When the user presses the exit (close) button 914, the document preview facility ends and returns to the application program. When the user presses the print button 915, the document preview facility prints the document, then ends and returns to the application program.

II. NAVIGATION CONTROLS

The facility provides navigation controls, which the user utilizes to view portions of the document not presently visible in the preview area. Navigation controls include preview position selection controls, which allow the user to select a different preview position within the current virtual window, and virtual window selection controls, which allow the user to select a different virtual window as the current virtual window.

A. PREVIEW POSITION SELECTION CONTROLS

Preview position selection controls allow the user to select a different preview position within the current virtual window. If the contents of the current virtual window are too large to be completely displayed the preview area, as currently sized, in either the horizontal or the vertical dimension, the facility displays the portion about the preview position that will fit and provides a scroll bar in each dimension in which the full extent of the current virtual windows is not displayed. For more information on scroll bars, see *The Windows Interface: An Application Design Guide*, Microsoft Corporation, 1992, pp. 58–59. Keystroke equivalents allow the user to use the keyboard instead of a pointing device to utilize many of the features of the scroll bar.

B. VIRTUAL WINDOW SELECTION CONTROLS

Virtual window selection controls allow the user to select a different virtual window as the current virtual window using virtual window selection buttons 908–911. If more than one virtual window contains elements, some of the virtual window selection controls are enabled. (In multiple page mode, one virtual window always contains all of the elements, as explained below.) In FIG. 9, rightward virtual window selection button 909 and downward virtual window selection button 911 are enabled. Particularly, if some virtual window contains an element that is adjacent in a certain direction to the element contained in the current virtual window, the virtual window selection control button corresponding to that direction is enabled. Clicking on that virtual window selection button causes the facility to make the virtual window that contains the adjacent element the current virtual window. Each virtual window selection button has a keystroke equivalent.

III. PREVIEW MODES

The facility provides a set of three preview modes: zoom, single page, and multiple page. Each mode specifies two preview characteristics: (1) an assignment of elements to virtual windows and (2) a magnification factor at which to display virtual window contents in the preview area. By changing the preview mode, the user can change these two preview characteristics.

The facility indicates the current preview mode by the condition of preview mode selection control buttons 905–907. One of them is always "depressed," or displayed as though it were a physical button whose facing surface was recessed below those of the other buttons, to indicate the current preview mode. In FIG. 9, zoom mode is current, so the zoom mode selection control 905 is depressed.

The user may select a new current preview mode in a number of ways. The user may click on the preview mode's selection button. Each preview mode selection button also has a keystroke equivalent (Alt-1 through Alt-3), which the user can type to select that preview mode as the current preview mode. Further, the facility provides a mode cycling keystroke (Alt-Z), which the user can type in order to select each of the available preview modes in succession.

A. ZOOM MODE

FIG. 9 is a display image that illustrates previewing a document when zoom mode is the current preview mode. Zoom mode specifies assigning each element to a different virtual window. It further specifies a constant magnification factor, which causes the facility to display elements at their actual size. As can be seen from the display image of FIG. 8, at such a magnification factor, the contents of the displayed element are legible.

In addition to the above listed methods for selecting zoom mode as the current preview mode, in single page mode the user may also click on the element that is displayed. This click causes the facility to select zoom mode as the current preview mode, and also causes it to select a preview position at or near the point on which the user clicked.

B. SINGLE PAGE MODE

Figure 10:
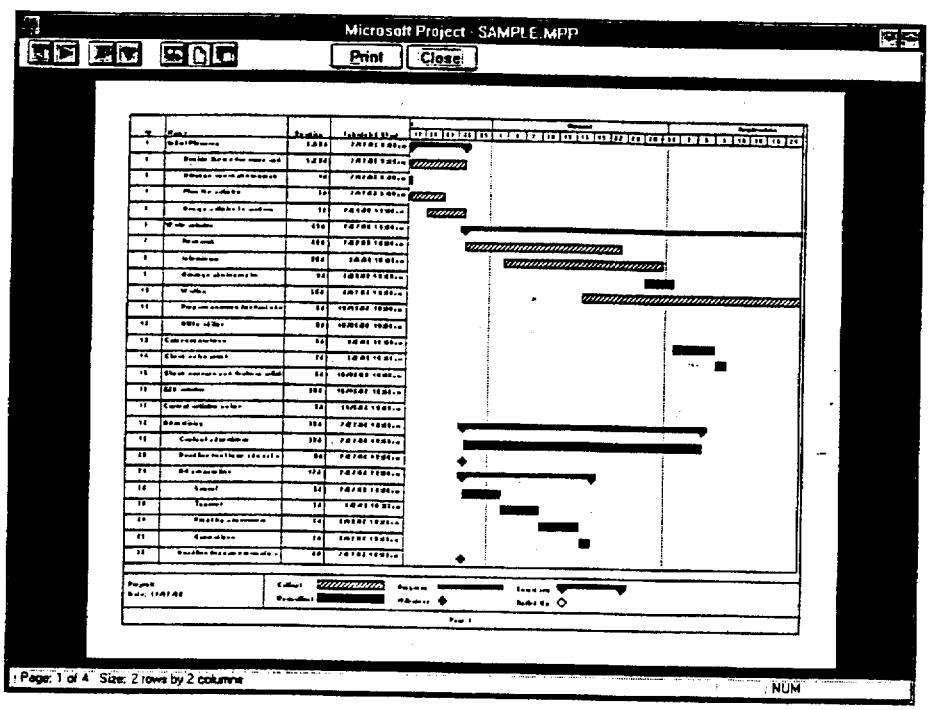
FIG. 10 is a display image that illustrates previewing a document when single page mode is the current preview mode.

FIG. 10 is a display image that illustrates previewing a document when single page mode is the current preview mode. Like zoom mode, single page mode specifies assigning each element to a different virtual window. It further specifies a magnification factor that will fit the image of the element being displayed to the size of the preview area. This is referred to as relative scaling. If the size of the preview area changes because the user resizes the preview window, the facility adjusts the magnification factor. As can be seen in FIG. 10, these preview characteristics yield a display image of the element that displays the entire element, as large as the preview area size will allow.

In addition to the above listed methods for selecting single page mode as the current preview mode, in zoom mode the user may also click anywhere within the preview area, and in multiple page mode the user may also click within an element. These cause the facility to select single page mode as the current preview mode. If the previous preview mode was multiple page mode, the current virtual window in single page mode is the one that contains the element that the user clicked on. If the previous preview mode was zoom mode, the current virtual window in single page mode is the same as the current virtual window was in zoom mode.

C. MULTIPLE PAGE MODE

Figure 11:
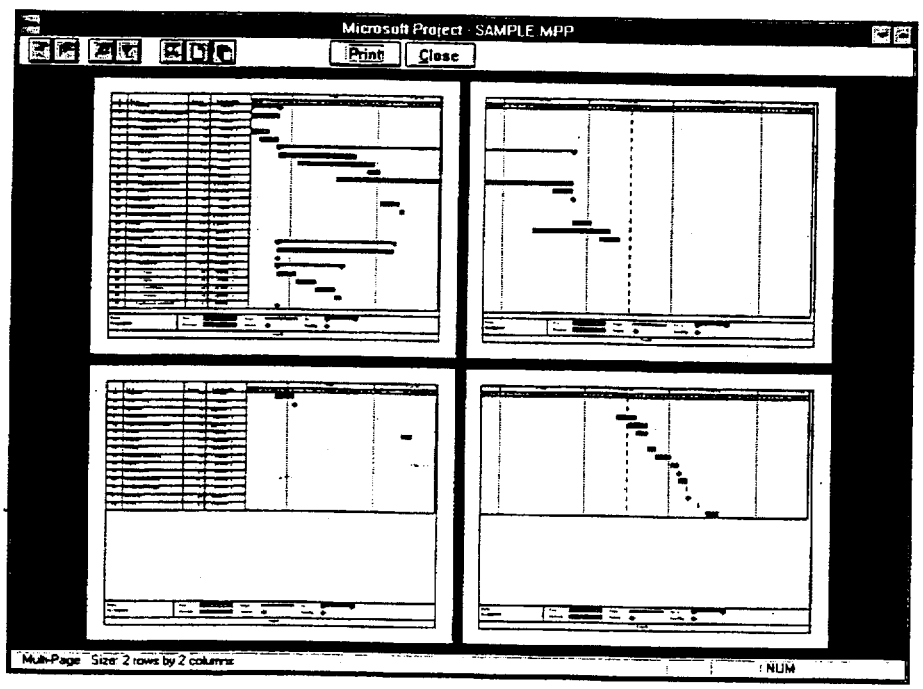
FIG. 11 is a display image that illustrates previewing a document when multiple page mode is the current preview mode.

FIG. 11 is a display image that illustrates previewing a document when multiple page mode is the current preview mode. Multiple page mode assigns all of the elements to a single virtual window. The facility therefore disables the virtual window selection controls. The multiple page mode further specifies a magnification factor that will fit the images of all of the elements being displayed to the size of the preview area, down to a minimum magnification factor. This is referred to as constrained relative scaling. As can be seen from the display image of FIG. 11, these preview characteristics yield a display image of as many elements as the preview area size and minimum magnification factor will allow, organized in a two-dimensional array. This mode is especially useful for previewing two-dimensional documents. The elements displayed in the two-dimensional array are separated by a constant number of pixels. This prevents the separation between elements from consuming excessive screen space at large magnification factors.

In addition to the above listed methods for selecting multiple page mode as the current preview mode, in single page mode the user may also click inside the preview area but outside the displayed element. This causes the facility to select multiple page mode as the current preview mode, and also causes it to select a preview position near the upper left hand corner of the single nonempty virtual window.

IV. SOFTWARE ROUTINES

A. APPLICATION OVERVIEW

In a preferred embodiment, the facility is implemented as a set of software routines integrated with an application program. The routines are designed to run under a windowing-type operating system, specifically Microsoft Windows (Windows). The facility preferably executes on general-purpose computer system including a central processing unit, computer memory, and input and output devices that include a display, a keyboard, and a mouse.

Figures 12A, 12B:
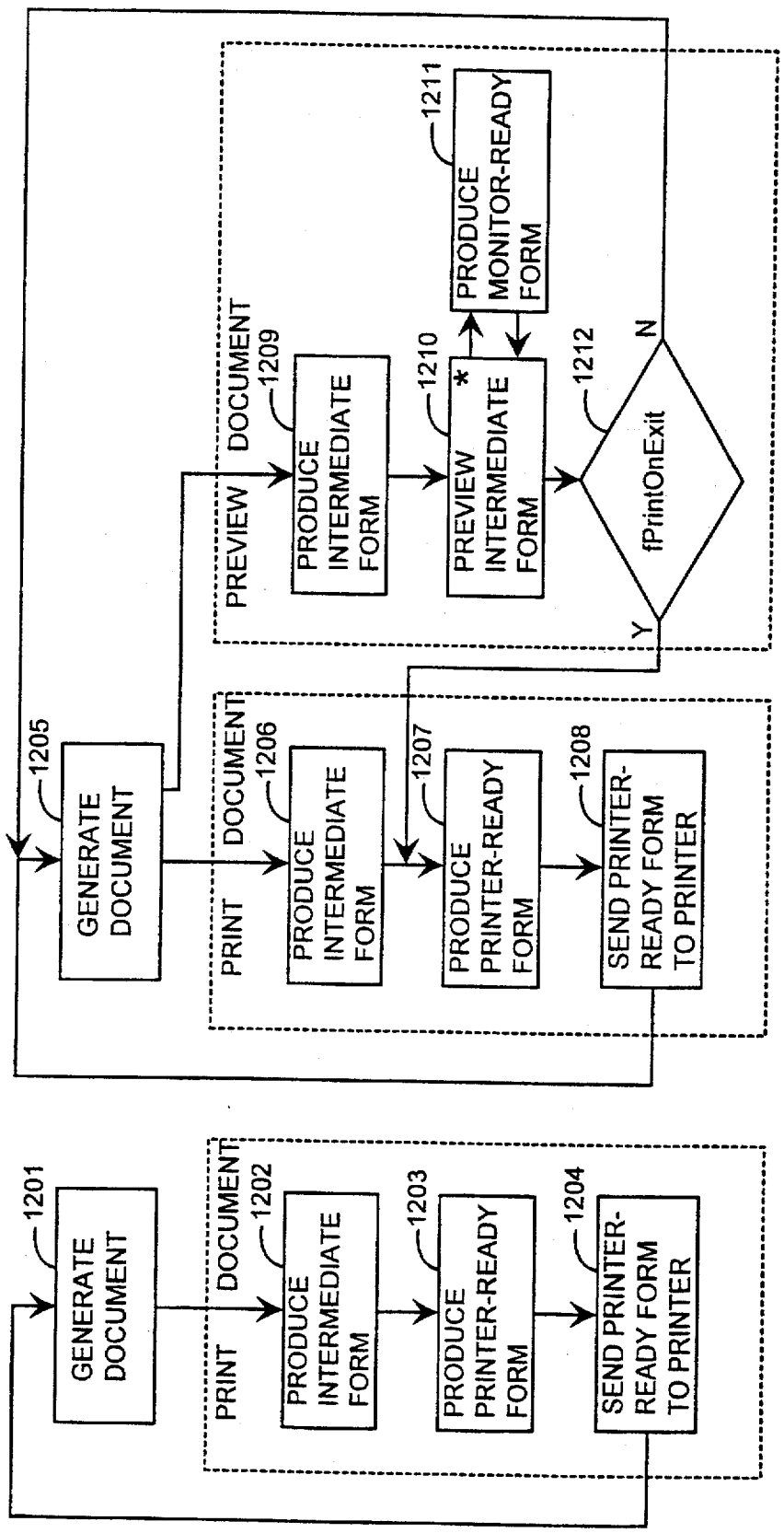
FIG. 12A is an overview flow diagram of the application program before being modified to include the preview facility.
FIG. 12B is an overview flow diagram of the application program as modified to include the preview facility.

FIG. 12B is an overview flow diagram of the application program as modified to include the preview facility. It is shown in contrast to FIG. 12A, which is an overview flow diagram of the application program before being modified to include the preview facility. In step 1201, the old application generates the document. This step includes allowing the user to issue a print document command. When the user issues a print document command, the old application prints the document in steps 1202–1204. In step 1202, the old application produces an intermediate version of the document that contains all formatting information, but is not tailored for any specific output device. In step 1203, the old application uses the intermediate version to produce a printer-ready version of the document. In step 1204, the old application transmits the printer-ready version to a printer. The old application then returns to generating the document in step 1201.

Steps 1205–1208 of the new application are identical to steps 1201–1204 of the old application, except that besides allowing the user to issue a print document command in 1205, the new application also allows the user to issue a preview document command. If the user issues the preview document command, the application continues at steps 1209–1212 to preview the document. In step 1209, the application produces an intermediate version of the document. Step 1209 is preferably identical to step 1206. In step 1210, the application previews the intermediate version of the document. Immediately after entering step 1210 and at various points during that step's processing, the application in step 1211 uses the intermediate version of the document to produce a display-ready version. More detail on step 1210 is provided by the flow diagram of FIG. 13. (An asterisk in the upper right hand corner of the step's box indicates that the step is described in more detail in another figure.) Step 1210 allows the user to issue an exit preview command and indicate whether the document should be printed upon exit. When the user issues an exit preview command, the application continues at step 1212. In step 1212, if fPrintOnExit, the print on exit flag, is set, then the application continues at step 1207, else the application continues at step 1205.

This preview facility design has two distinct advantages. First, re-using step 1206 as step 1209 to produce a previewable version of the document represents a coding efficiency, since it obviates the need for a special routine to perform that function. Second, allowing the user to print on exit from the preview document stage represents a processing efficiency, since it allows the user to print without repeating the time-consuming step of producing an intermediate version of the document.

B. MESSAGE PROCESSING ROUTINES

Programs designed to run under most modern windowing-type operating systems are referred to as "event driven." These programs do most of their processing in response to events external to them. Under Windows, event driven programs are informed about interesting events when they receive messages. Although some messages a program receives are from other programs, or, indeed, from itself, most messages are from the operating system. Some serve as notification that the user has manipulated a specific input device in a specific way, like pressing a key on the keyboard or moving the mouse to new coordinates. Others constitute requests from the operating system asking the program to perform some task, like repainting an area of the display that has been uncovered by the removal of an image that was formerly "on top of" an image generated by the program.

A program calls an operating system function to request its next message. The return value for this function call is a pointer to the message received. If a message is waiting, the operating system may return control to the program immediately. Otherwise, the program returns control after the next message is received. After the operating system returns control to the program, the program processes the message, doing whatever is required in response to the specific message received. After it completes message processing for this message, the program loops back up to request the next message. The preview facility follows this programming model. For more information on event-driven programming and descriptions of specific messages, refer to Charles Petzold, *Programming Windows* (2d ed. 1990).

Figure 13A:
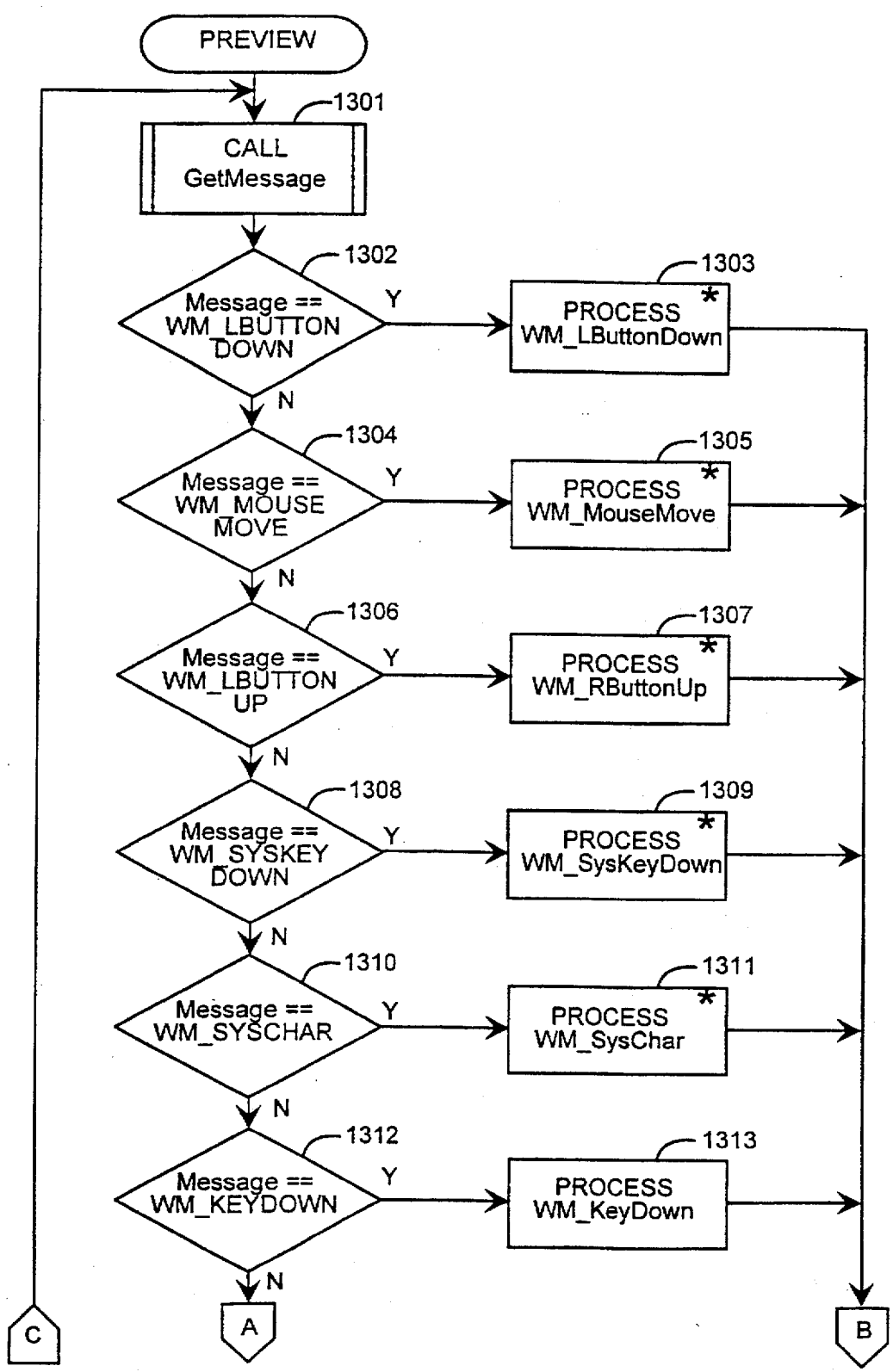
FIGS. 13A–13B show a flow diagram of the central message processing loop.
Figure 13B:
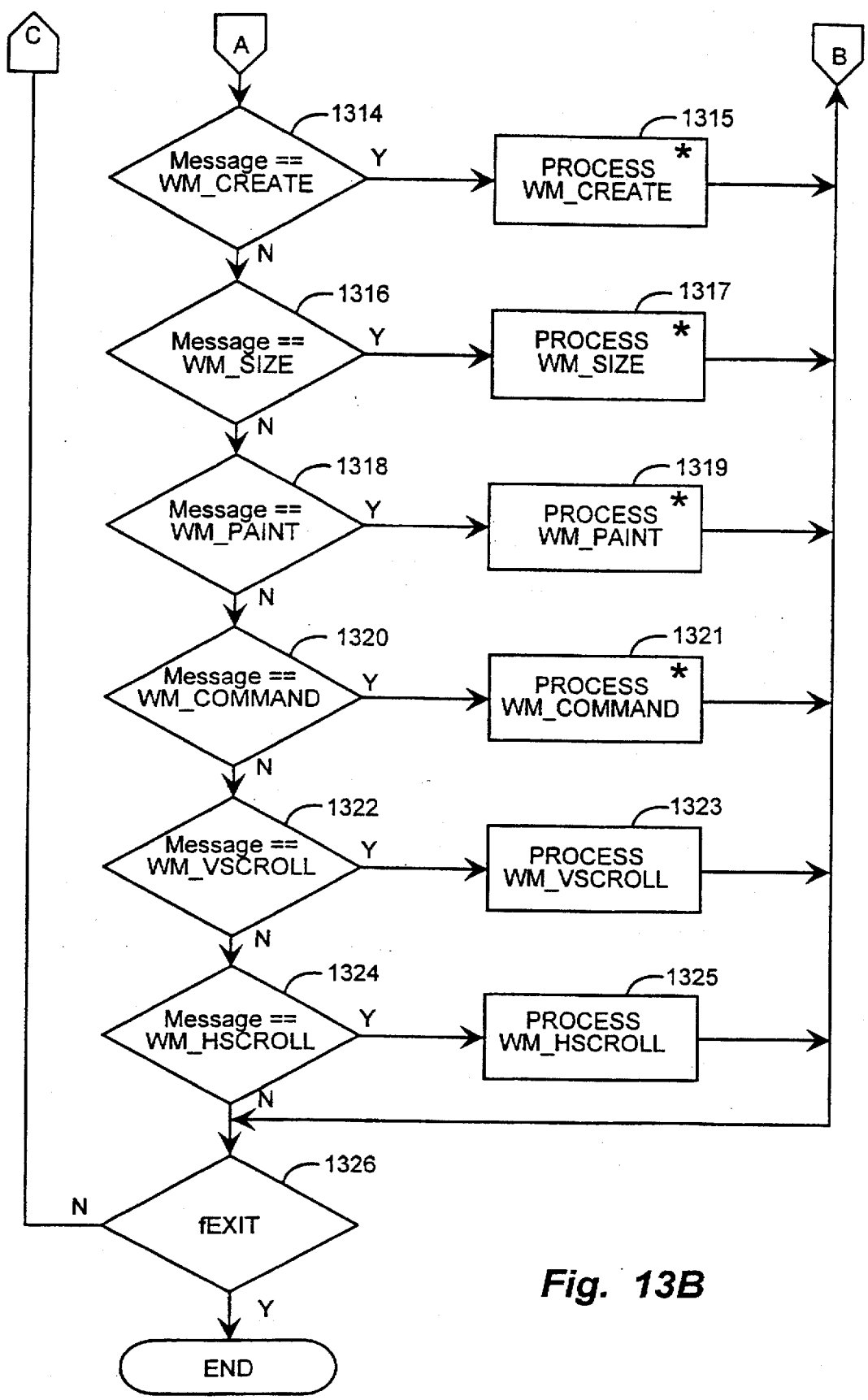
Figure 14A:
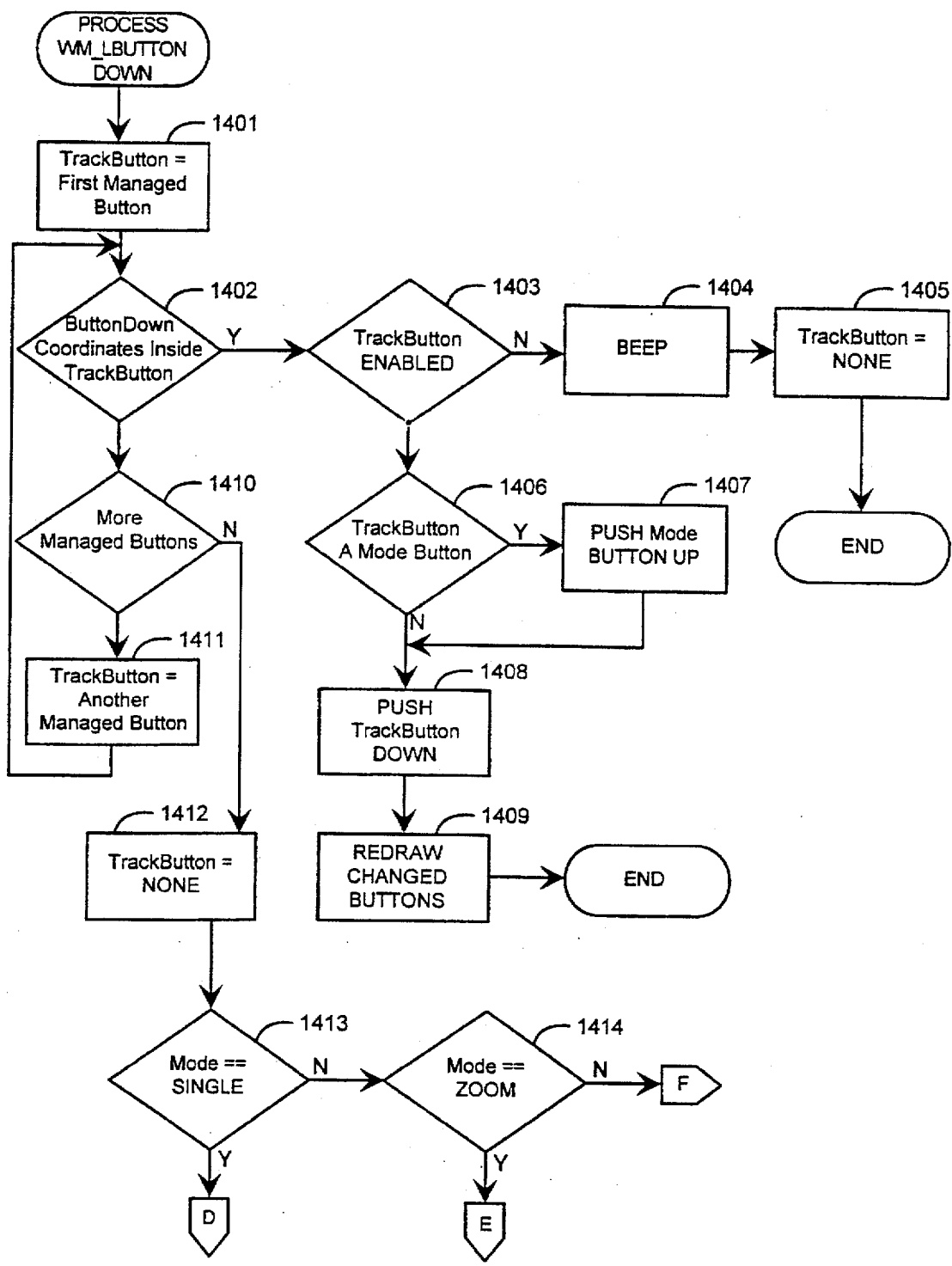
FIGS. 14A–14D are a flow diagram of the processing of a WM_LBUTTONDOWN message.
Figure 14B:
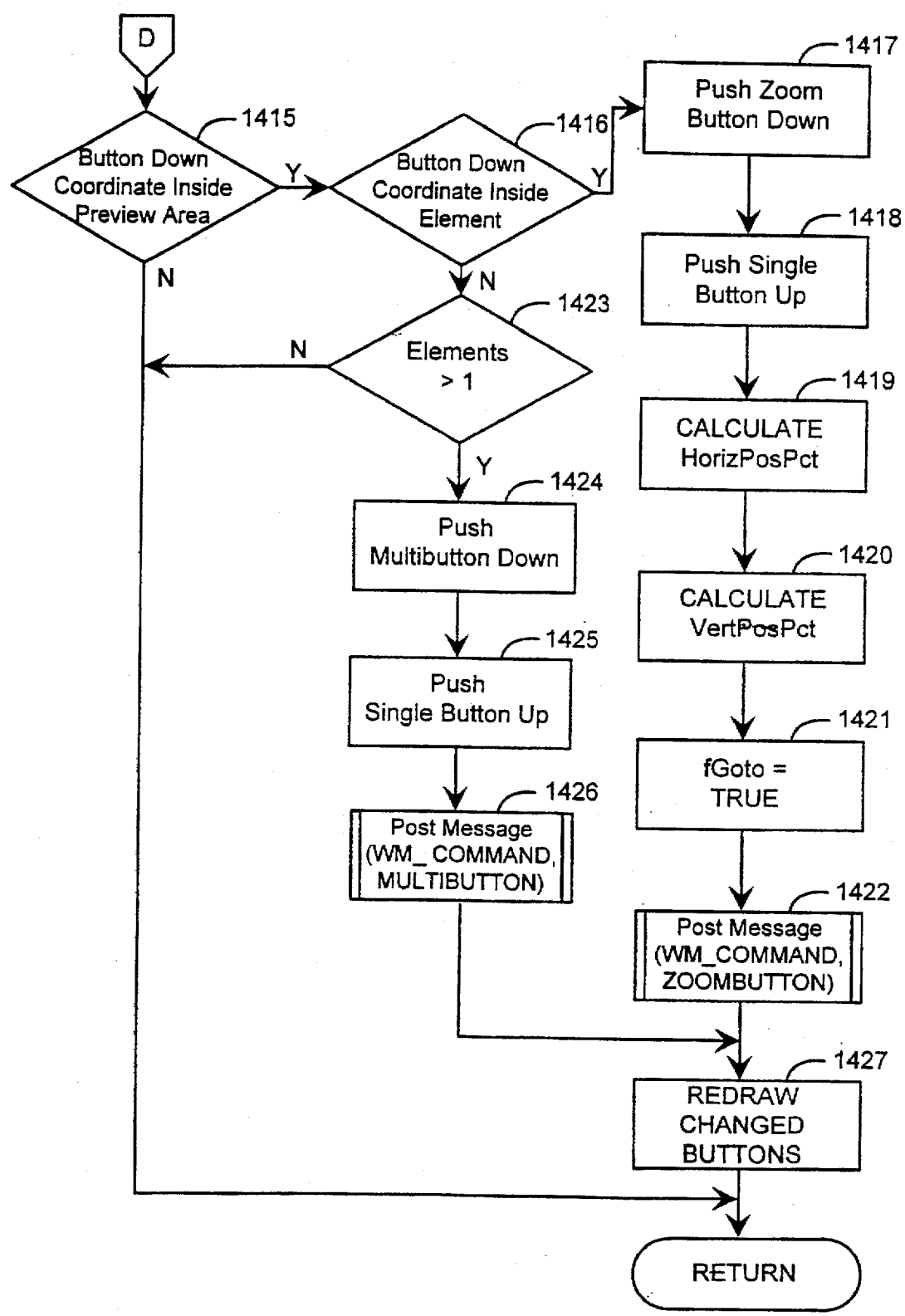
Figure 14C:
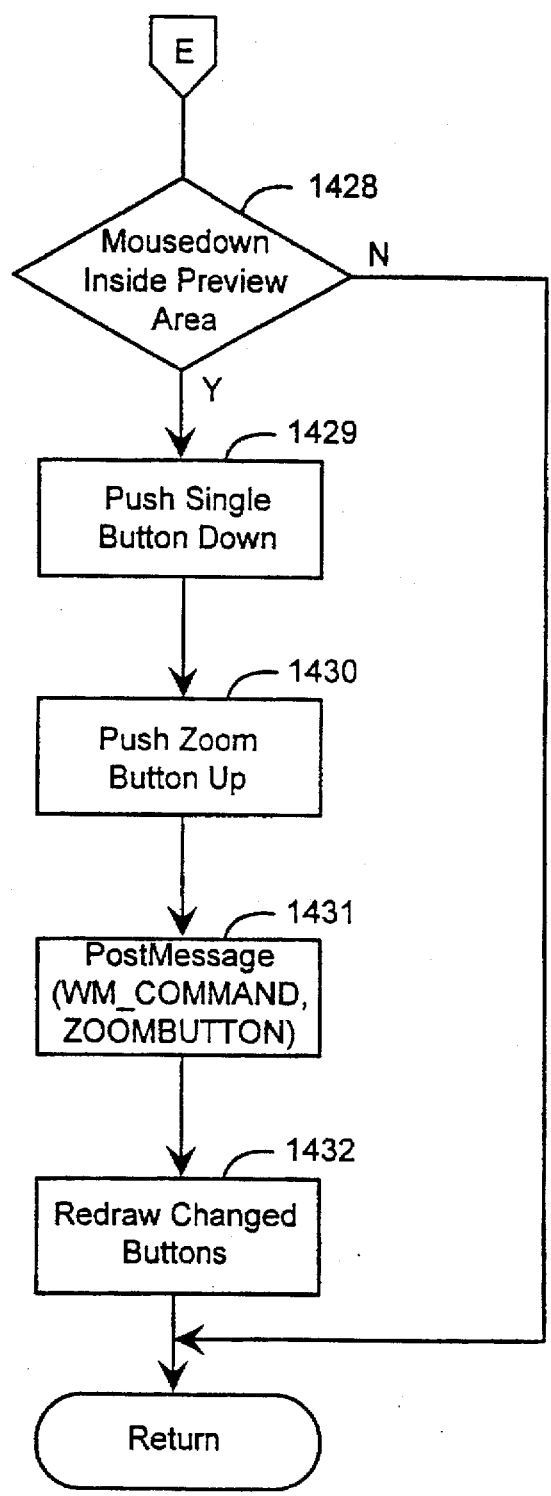
Figure 14D:
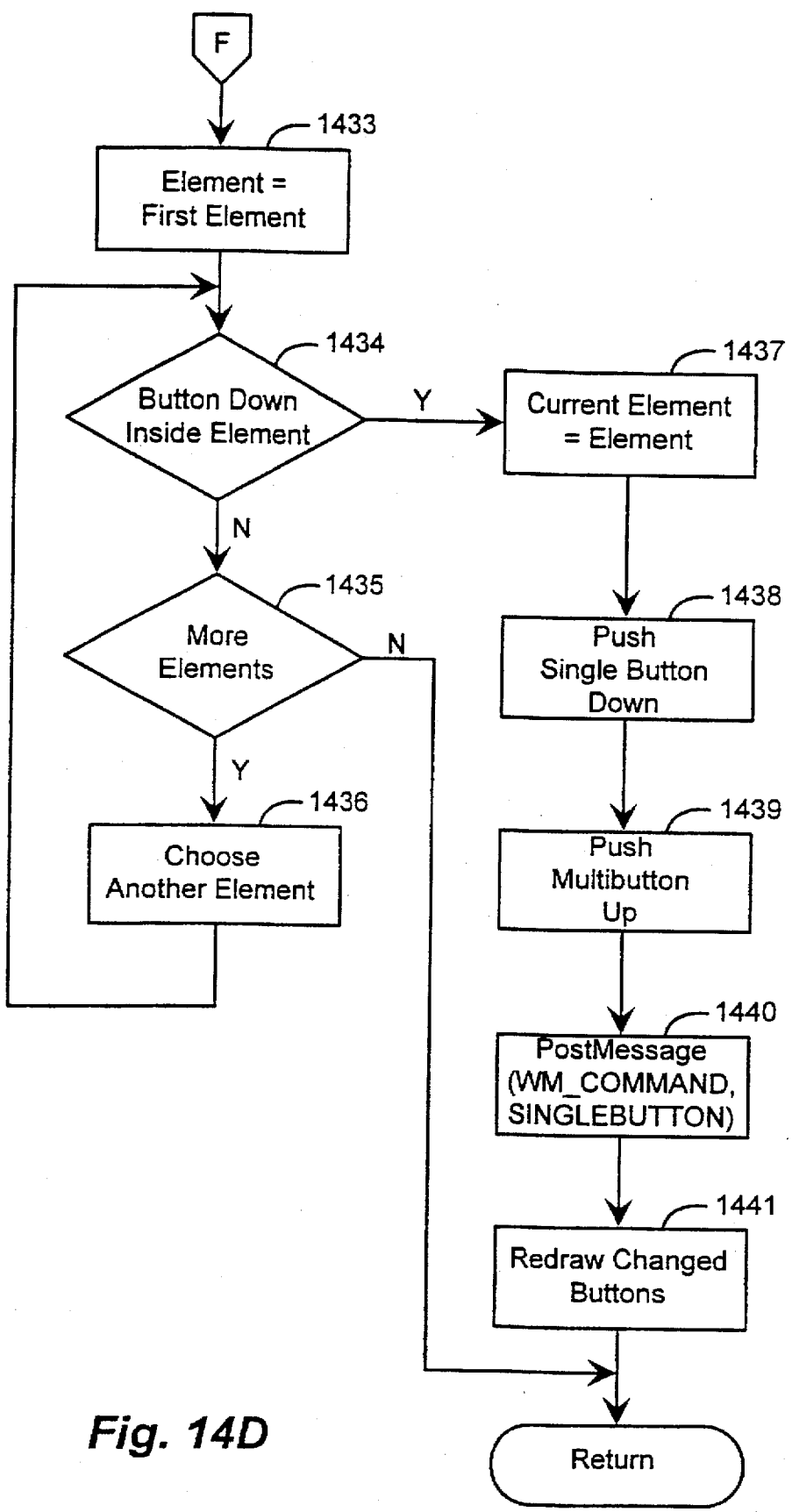

In a preferred embodiment, the facility employs a central message processing loop that requests messages from Windows and processes them. FIGS. 13A–B show is a flow diagram of the central message processing loop. It corresponds to step 1210 of the application, preview intermediate form. In step 1301, the facility calls operating system function GetMessage. The call returns when a message is available. In steps 1302–1324, the facility checks to see if the available message, stored in the variable Message, is one of a group of particular messages, and, if so, processes that message.

In steps 1302–1313, the facility checks for and processes input messages. In steps 1302–1307, the facility checks for and processes three mouse messages: WM_LBUTTONDOWN, WM_MOUSEMOVE, and WM_LBUTTONUP. In step 1302, if the message is WM_LBUTTONDOWN, then the facility continues at step 1303 to process the WM_LBUTTONDOWN, else the facility continues at step 1304. A WM_LBUTTONDOWN message indicates that the user has pressed down the primary button on the mouse. More detail on step 1303 is provided by the flow diagram of FIGS. 14A–14D. After executing step 1303, the facility continues through junction B at step 1326.

In step 1304, if the message is WM_MOUSEMOVE, then the facility continues at step 1305 to process the WM_MOUSEMOVE, else the facility continues at step 1306. A WM_MOUSEMOVE message indicates that the user has moved the mouse to new coordinates. More detail on step 1305 is provided by the flow diagram of FIG. 15. After executing step 1305, the facility continues through junction B at step 1326.

In step 1306, if the message is WM_LBUTTONUP, then the facility continues at step 1307 to process the WM_LBUTTONUP, else the facility continues at step 1308. A WM_LBUTTONUP message indicates that the user has released the primary button on the mouse. More detail on step 1307 is provided by the flow diagram of FIG. 16. After executing step 1307, the facility continues through junction B at step 1326.

In steps 1308–1313, the facility checks for and processes three keyboard messages: WM_SYSKEYDOWN, WM_SYSCHAR, and WM_KEYDOWN. In step 1308, if the message is WM_SYSKEYDOWN, then the facility continues at step 1309 to process the WM_SYSKEYDOWN, else the facility continues at step 1310. A WM_SYSKEYDOWN message indicates that the user has held down the Alt key while pressing one of a certain group of other keys. This message indicates that one of the keyboard equivalents for the virtual window selection controls may have been typed. More detail on step 1309 is provided by the flow diagram of FIG. 17. After executing step 1309, the facility continues through junction B at step 1326.

In step 1310, if the message is WM_SYSCHAR, then the facility continues at step 1311 to process the WM_SYSCHAR, else the facility continues at step 1312. A WM_SYSCHAR message, like a WM_SYSKEYDOWN message, indicates that the user has held down the Alt key while pressing one of a certain group of other keys. This message indicates that one of the mode selection control equivalents may have been typed. More detail on step 1311 is provided by the flow diagram of FIG. 18. After executing step 1311, the facility continues through junction B at step 1326.

In step 1312, if the message is WM_KEYDOWN, then the facility continues at step 1313 to process the WM_KEYDOWN, else the facility continues through junction A at step 1314. A WM_KEYDOWN message indicates that the user has pressed a single key. This message indicates that one of the preview position selection control equivalents may have been typed. In step 1313, the facility checks for keyboard equivalents of the preview position selection controls. If an equivalent is detected, the facility posts itself a WM_VSCROLL or WM_HSCROLL message to be processed by a future iteration of the message processing loop in steps 1322–1325, which will actually perform the scrolling. After executing step 1313, the facility continues through junction B at step 1326.

In steps 1314–1325, the facility checks for and processes six operating system messages: WM_CREATE, WM_SIZE, WM_PAINT, WM_COMMAND, WM_VSCROLL, and WM_HSCROLL. In step 1314, if the message is WM_CREATE, then the facility continues at step 1315 to process the WM_CREATE, else the facility continues at step 1316. A WM_CREATE message indicates that the message processing loop should perform any initialization necessary. It is the first message that the facility receives. More detail on step 1315 is provided by the flow diagram of FIG. 19. After executing step 1315, the facility continues at step 1326.

In step 1316, if the message is WM_SIZE, then the facility continues at step 1317 to process the WM_SIZE, else the facility continues at step 1318. A WM_SIZE message indicates that the user has changed the size of the preview window. More detail on step 1317 is provided by the flow diagram of FIG. 20. After executing step 1317, the facility continues at step 1326.

In step 1318, if the message is WM_PAINT, then the facility continues at step 1319 to process the WM_PAINT, else the facility continues at step 1320. A WM_PAINT message indicates that a region of the preview window needs to be redrawn. More detail on step 1319 is provided by the flow diagram of FIGS. 21A–21B. After executing step 1319, the facility continues at step 1326.

In step 1320, if the message is WM_COMMAND, then the facility continues at step 1321 to process the WM_COMMAND, else the facility continues at step 1322. A WM_COMMAND message indicates that a display button has been pressed. This message can be posted either by Windows, with respect to buttons that it manages, or the facility in step 1307, with respect to buttons that the facility manages itself. More detail on step 1321 is provided by the flow diagram of FIG. 22. After executing step 1321, the facility continues at step 1326.

In step 1322, if the message is WM_VSCROLL, then the facility continues at step 1323 to process the WM_VSCROLL, else the facility continues at step 1324. A WM_VSCROLL message may be posted either by Windows in response to the user manipulating the vertical scroll bar with the mouse or by the facility in step 1313 in response to the user typing a keyboard equivalent. In step 1323, the facility shifts the contents of the current virtual window up or down within the preview area in a way that is well known in the art. After executing step 1323, the facility continues at step 1326.

In step 1324, if the message is WM_HSCROLL, then the facility continues at step 1325 to process the WM_HSCROLL, else the facility continues at step 1326. A WM_HSCROLL message may be posted either by Windows in response to the user manipulating the horizontal scroll bar with the mouse or by the facility in step 1313 in response to the user typing a keyboard equivalent. In step 1325, the facility shifts the contents of the current virtual window left or right within the preview area in a way that is well known in the art. After executing step 1325, the facility continues at step 1326.

In step 1326, if user has set the exit flag, fExit, by pressing either the print button or the close button, then the message processing loop ends and the facility continues at step 1212, else the facility continues through junction C at step 1301 to get another message.

1. INPUT MESSAGES

Input messages inform the program that the user has interacted with an input device. The facility processes input messages about the mouse and the keyboard.

a. MOUSE MESSAGES

The facility processes three mouse messages: WM_LBUTTONDOWN, WM_MOUSEMOVE, and WM_LBUTTONUP. While Windows applications do not usually need to process mouse messages directly, there are three reasons why the facility does: 1) By processing the mouse messages itself, the facility is able to allow the user to change the current mode by clicking in the preview area. 2) When the facility manages the mode buttons itself instead of instructing Windows to manage them, it is able to leave a mode button depressed to reflect the current mode. 3) When managing buttons itself, the facility is further able to disable managed buttons when pressing them would be inappropriate. For these reasons, the facility processes the above three messages when the mouse coordinates are within a virtual window selection button, a mode button, or the preview area.

In processing each message, the facility posts itself a WM_COMMAND message, like the one that Windows would post if Windows were processing the message. Depending on the place in which the buttondown occurs, the facility posts the message at different stages of the WM_LBUTTONDOWN, WM_MOUSEMOVE, WM_LBUTTONUP sequence. For buttondowns in the preview area, the facility posts a WM_COMMAND message immediately, or in response to the WM_LBUTTONDOWN message. For buttondowns in a button, the facility waits to make sure that the buttonup also occurs in the same button. It therefore posts the WM_COMMAND message in response to the WM_LBUTTONUP message.

i. WM_LBUTTONDOWN

A WM_LBUTTONDOWN message indicates that the user has pressed down the primary button on the mouse. FIGS. 14A–14D are a flow diagram of the processing of a WM_LBUTTONDOWN message. This diagram corresponds to step 1303 of the message processing loop. In steps 1401–1402 and 1410–1411, the facility determines whether the mouse coordinates at which the buttondown occurred fall inside any of the buttons that the facility manages. In step 1401, the facility sets the variable TrackButton to designate the first button managed by the facility. The buttons managed by the facility are the virtual window selection buttons and the mode selection buttons. In step 1402, if the mouse coordinates at which the buttondown occurred fall inside the button designated by the variable TrackButton, then the facility continues at step 1403, else the facility continues at step 1410.

In steps 1403–1409, the facility processes the buttondown within the managed button designated by TrackButton. In step 1403, if the button designated by TrackButton is enabled, then the buttondown is proper and the facility continues at step 1406, else the buttondown is improper and the facility continues at step 1404. In step 1404, the facility issues an audible beep. In step 1405, the facility clears the TrackButton variable and returns.

In step 1406, if the button designated by the variable TrackButton is a mode selection button, then the facility pushes up the button designated by the Mode variable, which was previously down, else the facility continues at step 1408. In step 1408, the facility pushes down the button designated by the variable TrackButton. In step 1409, the facility redraws each button whose state has changed and returns.

In step 1410, if other managed buttons remain, then the facility continues at step 1411, else it continues at step 1412. In step 1411, the facility sets the variable TrackButton to designate another managed button, and the facility continues at step 1402.

In steps 1412–1440, the facility processes a buttondown within the preview area. In step 1412, the facility clears the TrackButton variable. In step 1413, if the current mode is single page mode, then the facility continues through junction D at step 1415, else the facility continues at step 1414. In step 1414, if the current mode is zoom mode, then the facility continues through junction E at step 1428, else the current mode is multiple page mode and the facility continues through junction F at step 1433.

In steps 1415–1427, the facility processes a buttondown in the preview area in single page mode. In step 1415, if the mouse coordinates at which the buttondown occurred fall inside the preview area, then the facility continues at step 1416, else the facility returns. In step 1416, if the mouse coordinates at which the buttondown occurred fall inside the element displayed, then the facility continues at step 1417, else the facility continues at step 1421.

In steps 1417–1422, the facility changes the states of the mode buttons, calculates a new percentile preview position, and posts itself a message to simulate button handling by Windows. The percentile preview position is a measure of the position of the buttondown relative to the entire element. The facility uses the percentile preview position to display the buttondown position in the center of the preview area when it displays the element in zoom mode. The percentile preview position has two components. Percentile horizontal position is the ratio of the distance between the left edge of the element and the buttondown position to the element width. Similarly, percentile vertical position is the ratio of the distance between the top edge of the element and the buttondown position to the element height.

In step 1417, the facility pushes down the zoom mode button. In step 1418, the facility pushes up the single page mode button, which was down. In step 1419, the facility calculates the percentile horizontal position of the buttondown within the element. The ratio is given by the following expression: (horizontal mouse position)/(element width). In this expression and in succeeding ones, horizontal and vertical mouse position are relative to the upper left-hand corner of the element in the current virtual window. In step 1420, the facility calculates the percentile vertical position within the element. The result is given by the following expression: (vertical mouse position)/(element height). In step 421, the facility sets the fGoto flag equal to true, so that the facility will use the percentile position to calculate a new actual position in the support subroutine CalcLayout. In step 1422, the facility posts a WM_COMMAND message with the parameter ZOOMBUTTON and continues at step 1427. Parameters of the WM_COMMAND message are described further below in conjunction with the process that processes WM_COMMAND messages.

In step 1423, if the number of elements is greater than one, then the facility continues at step 1424, else the process ends and the facility returns. In steps 1424–1426, the facility changes the states of the mode buttons and posts itself a message to simulate button handling by Windows. In step 1424, the facility pushes down the multiple page mode button. In step 1425, the facility pushes up the single page mode button, which was down. In step 1426, the facility posts a WM_COMMAND message with the parameter MULTIBUTTON.

In step 1427, the facility redraws any changed mode buttons. The process then returns.

In steps 1428–1432, the facility processes a buttondown in the preview area in zoom mode. In step 1428, if the mouse coordinates at which the buttondown occurred fall inside the preview area, then the facility continues at step 1429, else the process returns. In steps 1429–1431, the facility changes the states of the mode buttons and posts itself a message to simulate button handling by Windows. In step 1429, the facility pushes down the single page mode button. In step 1430, the facility pushes up the zoom mode button, which was down. In step 1431, the facility posts a WM_COMMAND message with the parameter SINGLEBUTTON.

In step 1432, the facility redraws any changed mode buttons. The process then returns.

In steps 1433–1431, the facility processes a buttondown in the preview area in multiple page mode. In steps 1433–1436, the facility loops through the displayed elements. If the mouse position at which the buttondown occurred fall inside a displayed element, the facility in steps 1437–1441 set the current element equal to that element, changes the states of the buttons, and posts itself a message to simulate button handling by Windows.

In step 1433, the facility sets the variable Element to designate the first displayed element. In step 1434, if the mouse coordinates at which the buttondown occurred fall inside the element designated by Element, then the facility continues at step 1437, else the facility continues at step 1435. In step 1435, if other displayed elements remain, then the facility continues at step 1436, else the process ends and the facility continues at step 1327 of the message processing loop. In step 1436, the facility sets the variable Element to designate another displayed element, and the facility continues at step 1434.

In step 1437, the facility sets the variable that holds the current element, CurrentElement, to designate the element inside which the buttondown occurred. In step 1438, the facility pushes down the single page mode button. In step 1439, the facility pushes up the multiple page mode button, which was down. In step 1440, the facility posts a WM_COMMAND message with the parameter SINGLEBUTTON, a message that Windows would post if it was managing the mode selection buttons. In step 1441, the facility redraws any changed mode buttons. The process then returns.

ii. WM_MOUSEMOVE

Figure 15:
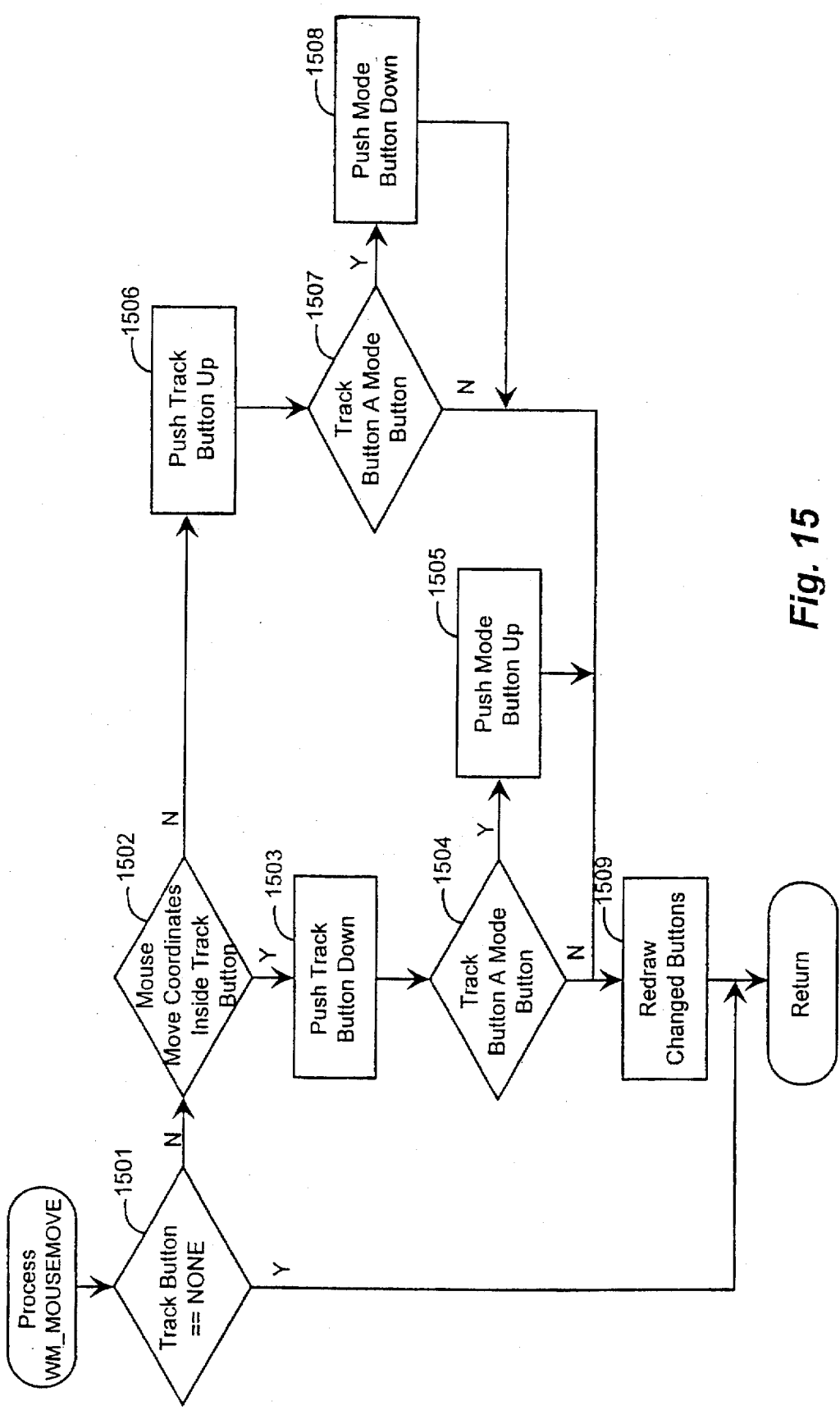
FIG. 15 is a flow diagram of the processing of a WM_MOUSEMOVE message.

A WM_MOUSEMOVE message indicates that the user has moved the mouse to new coordinates. FIG. 15 is a flow diagram of the processing of a WM_MOUSEMOVE message. In the process, the facility determines which buttons should be pushed down or up, based on whether the new mouse coordinates are inside the button in which the buttondown occurred. In step 1501, if the BUTTONDOWN did not occur inside a display button, and TrackButton equals NONE, then the process ends and the facility returns, else the facility continues at step 1502. In step 1502, if the new mouse coordinates are inside the button designated by the variable TrackButton, then the facility continues at step 1503, else the facility continues at step 1506.

In steps 1503–1505, the mouse is in the buttondown button, and the facility pushes it down and, if it is a mode button, pushes the old mode button up. In step 1503, the facility pushes down the button designated by the variable TrackButton. In step 1504, if the button designated by the variable TrackButton is a mode selection button, then the facility continues at step 1505, else the facility continues at step 1509. In step 1505, the facility pushes up the button for the current mode designated by the variable Mode.

In steps 1506–1508, the mouse is not in the buttondown button, and the facility pushes it up and, if it is a mode button, pushes the old mode button down. In step 1506, the facility pushes up the button designated by the variable TrackButton. In step 1507, if the button designated by the variable TrackButton is a mode selection button, then the facility continues at step 1508, else the facility continues at step 1509. In step 1508, the facility pushes down the button for the current mode designated by the variable Mode.

In step 1509, the facility redraws any changed buttons. The process then ends and the facility returns.

iii. WM_LBUTTONUP

Figure 16:
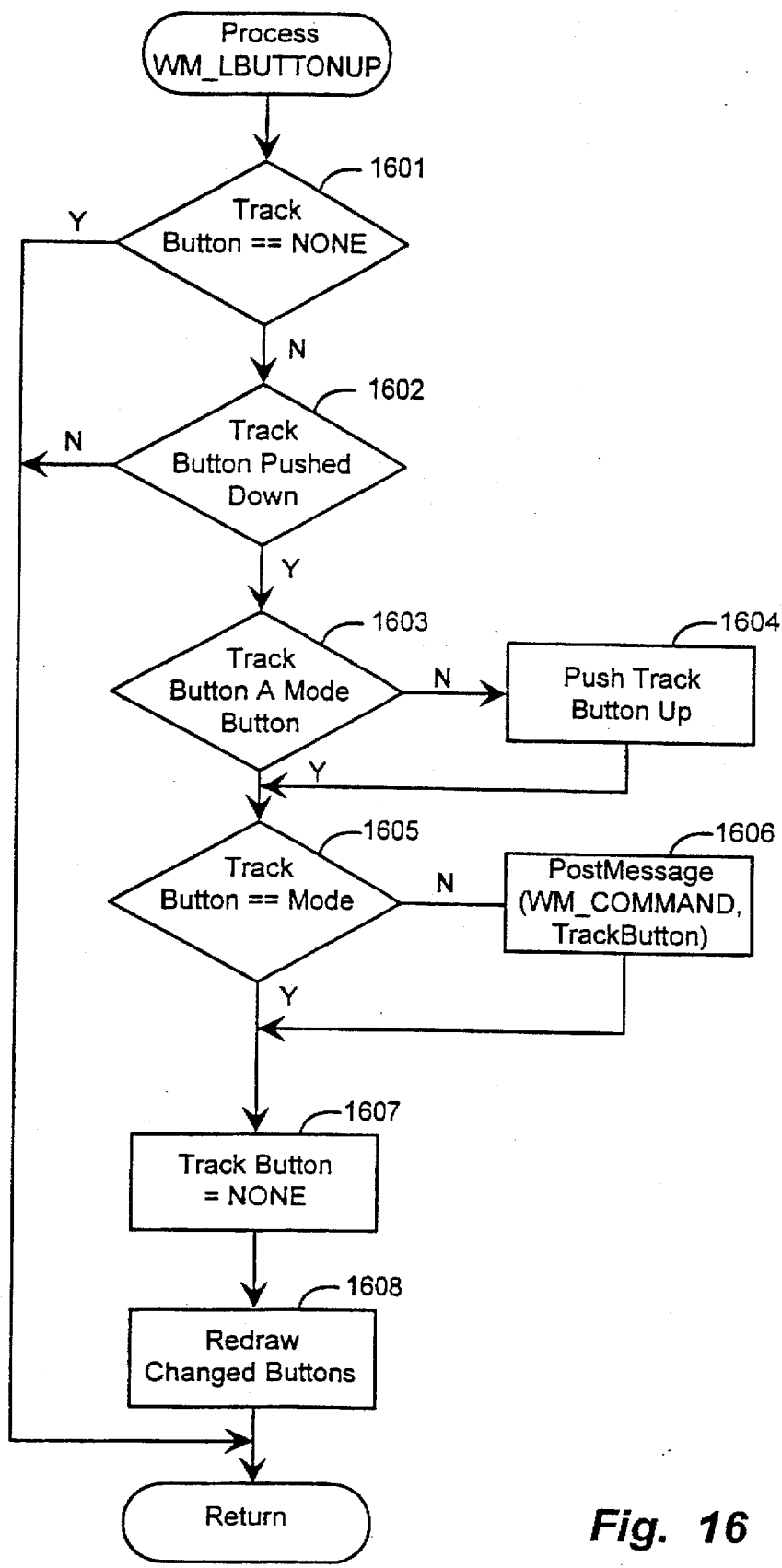
FIG. 16 is a flow diagram of the processing of a WM_LBUTTONUP message.

A WM_LBUTTONUP message indicates that the user has released the primary button on the mouse. FIG. 16 is a flow diagram of the processing of a WM_LBUTTONUP message. This diagram corresponds to step 1305 of the message processing loop. If the buttonup occurred within the button designated by the variable TrackButton and that button is pushed down, the process posts a WM_COMMAND message for that button.

In step 1601, if the variable TrackButton equals NONE, then the buttondown did not occur in a managed button, and the process ends and the facility continues at step 1326 of the message processing loop, else the facility continues at step 1602. In step 1602, if the button designated by TrackButton is pushed down, then the facility continues at step 1603, else the process ends and the facility returns.

In step 1603, if the button designated by TrackButton is a mode selection button, then that button should remain pushed down and the facility continues at step 1605, else the facility pushes up the button designated by TrackButton in step 1604. In step 1605, if the button designated by Track-Button is the button for the current mode, then a WM_COMMAND message need not be posted and the facility continues at step 1605, else the facility posts a WM_COMMAND message with the parameter TrackButton, a message that Windows would post if it was managing the button, in step 1606.

In step 1607, the facility sets TrackButton equal to NONE. In step 1608, the facility redraws any changed buttons. The process then ends and the facility returns.

b. KEYBOARD MESSAGES

The facility processes three keyboard messages: WM_SYSKEYDOWN, WM_SYSCHAR, and WM_KEYDOWN. Each is posted when the user presses a key or a combination of keys.

.i. WM_SYSKEYDOWN

Figure 17:
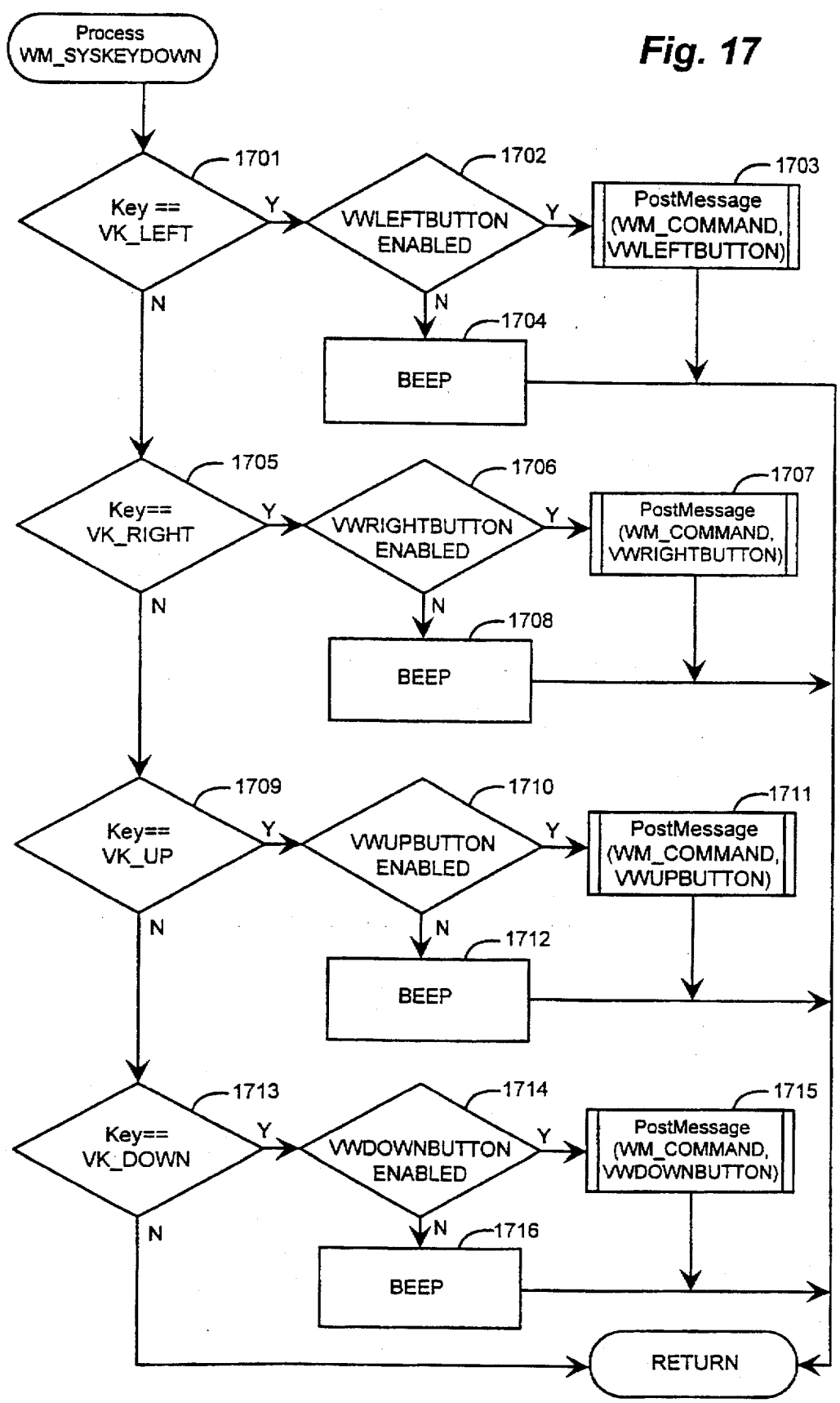
FIG. 17 is a flow diagram of the processing of a WM_SYSKEYDOWN message.

A WM_SYSKEYDOWN message indicates that the user has held down the Alt key while pressing one of a certain group of other keys. This message indicates that one of the element selection control equivalents may have been typed. FIG. 17 is a flow diagram of the processing of a WM_SYSKEYDOWN message. This diagram corresponds to step 1309 of the message processing loop. In this process, the facility checks to see if any of the arrow keys were pressed in conjunction with the Alt key. If so, and if the corresponding virtual window selection button is enabled, the facility posts a WM_COMMAND message as if that virtual window selection button had been pressed.

In step 1701, if the key pressed with the A/t key was the left arrow key, represented by the constant VK_LEFT, then the facility continues at step 1702, else the facility continues at step 1705. If the leftward virtual window selection button is enabled, then the facility posts a WM_COMMAND message with the parameter VWLEFTBUTTON in step 1703 as if the leftward virtual window selection button had been pressed, else the facility issues an audible beep in step 1704. After executing step 1703 or 1704, the process returns.

In step 1705, if the key pressed with the Alt key was the right arrow key, represented by the constant VK_RIGHT, then the facility continues at step 1706, else the facility continues at step 1709. If the rightward virtual window selection button is enabled, then the facility posts a WM_COMMAND message with the parameter VWRIGHTBUTTON in step 1707 as if the rightward virtual window selection button had been pressed, else the facility issues an audible beep in step 1708. After executing step 1707 or 1708, the process returns.

In step 1709, if the key pressed with the Alt key was the up arrow key, represented by the constant VK_UP, then the facility continues at step 1710, else the facility continues at step 1713. If the upward virtual window selection button is enabled, then the facility posts a WM_COMMAND message with the parameter VWUPBUTTON in step 1711 as if the upward virtual window selection button had been pressed, else the facility issues an audible beep in step 1712. After executing step 1711 or 1712, the process returns.

In step 1713, if the key pressed with the Alt key was the down arrow key, represented by the constant VK_DOWN, then the facility continues at step 1714, else the process returns. If the downward virtual window selection button is enabled, then the facility posts a WM_COMMAND message with the parameter VWDOWNBUTTON in step 1715 as if the downward virtual window selection button had been pressed, else the facility issues an audible beep in step 1716. After executing step 1715 or 1716, the process returns.

ii. WM_SYSCHAR

Figure 18:
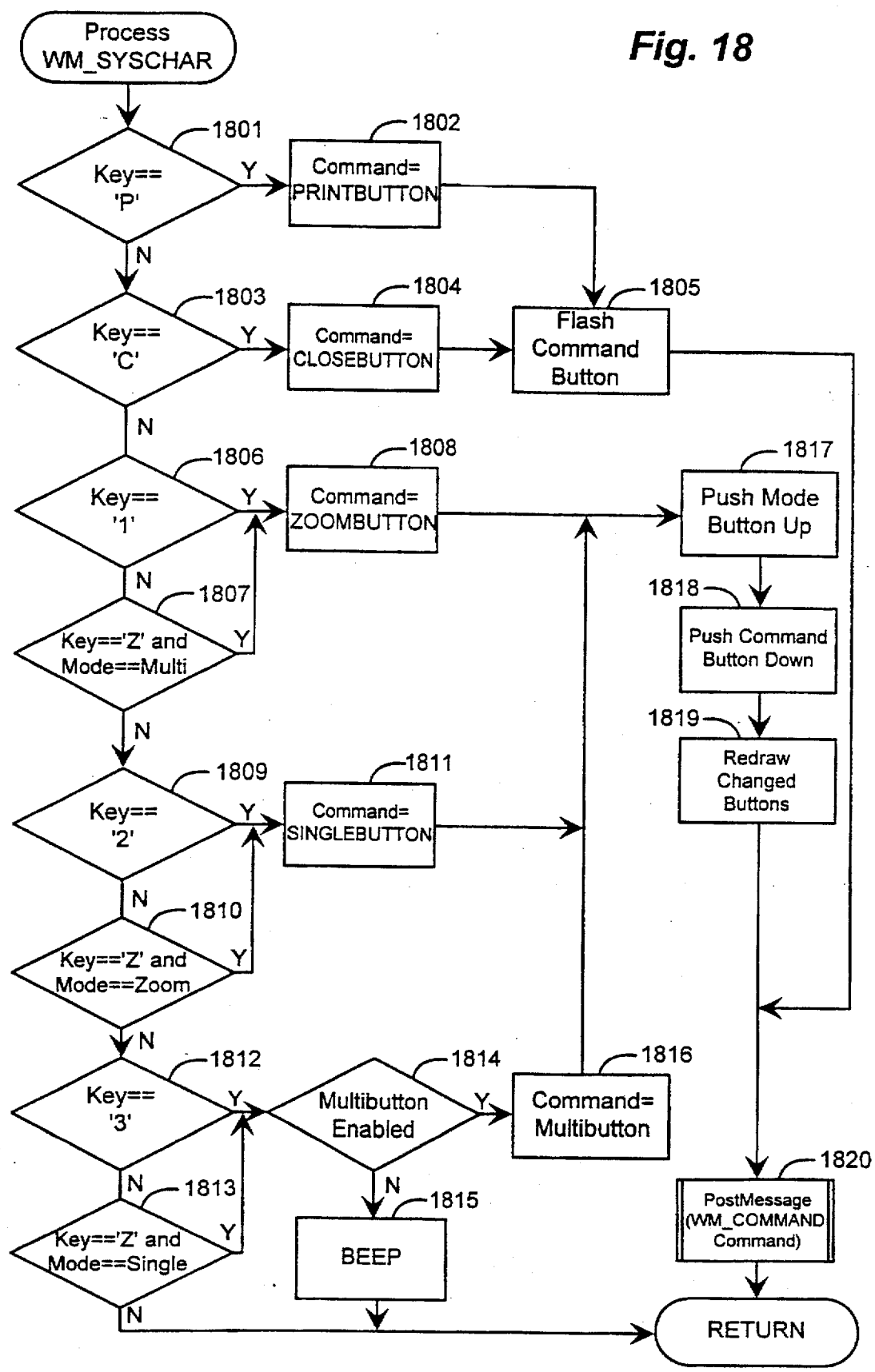
FIG. 18 is a flow diagram of the processing of a WM_SYSCHAR message.

A WM_SYSCHAR message indicates that the user has held down the Alt key while pressing one of a certain group of other keys. This message indicates that one of the mode selection control equivalents may have been typed. FIG. 18 is a flow diagram of the processing of a WM_SYSCHAR message. This diagram corresponds to step 1311 of the message processing loop. In this process, the facility checks to see if the P, C, 1, 2, 3, or Z keys were pressed in conjunction with the Alt key. If so, the facility posts a WM_COMMAND message as if the corresponding button had been pressed.

In steps 1801–1805, the facility processes the keyboard equivalents for the print button and the cancel button. In step 1801, if the key pressed with the Alt key was the P key, then the facility continues in step 1802, else the facility continues at step 1803. In step 1802, the facility sets the Command variable equal to PRINTBUTTON, and the facility continues at step 1805.

In step 1803, if the key pressed with the Alt key was the C key, then the facility continues in step 1804, else the facility continues at step 1805. In step 1804, the facility sets Command equal to CLOSEBUTTON. In step 1805, the facility flashes the button designated by Command, and the facility continues at step 1819.

In steps 1806–1819, the facility processes the keyboard equivalents for mode selection buttons, as well as the mode cycling keystroke. In step 1806, if the key pressed with the Alt key was the 1 key, then the facility continues in step 1808, else the facility continues at step 1807. In step 1807, if the if the key pressed with the Alt key was the Z key and the current mode is multiple page mode, then the facility continues at step 1808, else the facility continues at step 1809. In step 1808, the facility sets Command equal to ZOOMBUTTON, and the facility continues at step 1817.

In step 1809, if the key pressed with the Alt key was the 2 key, then the facility continues in step 1811, else the facility continues at step 1810. In step 1810, if the if the key pressed with the Alt key was the Z key and the current mode is zoom mode, then the facility continues at step 1811, else the facility continues at step 1812. In step 1811, the facility sets Command equal to SINGLEBUTTON, and the facility continues at step 1817.

In step 1812, if the key pressed with the Alt key was the 3 key, then the facility continues in step 1814, else the facility continues at step 1813. In step 1813, if the if the key pressed with the Alt key was the Z key and the current mode is single page mode, then the facility continues at step 1814, else the process returns. In step 1814, if the multiple page mode button is enabled, then the facility continues at step 1816, else the facility continues at step 1815. In step 1815, the facility issues an audible beep, the process returns. In step 1816, the facility sets Command equal to SINGLEBUTTON.

In step 1817, the facility pushes up the button designated by the Mode variable. In step 1818, the facility pushes down the button designated by the Command variable. In step 1819, the facility redraws any changed mode buttons.

In step 1820, the facility posts a WM_COMMAND message with the parameter Command, as if the corresponding mode selection button had been pressed. After executing step 1820, the process returns.

iii. WM_KEYDOWN

A WM_KEYDOWN message indicates that the user has pressed a single key. This message indicates that one of the preview position control equivalents may have been typed. In step 1313, the facility checks for keyboard equivalents of the preview position controls. If they are detected, the facility posts itself a WM_$_{VSCROLL\ or\ WM}$_HSCROLL message to be processed by a future iteration of the message processing loop in steps 1322–1325, which will actually perform the scrolling. Processing scroll bar keyboard equivalents is well known in the art.

2. OPERATING SYSTEM MESSAGES

Operating system messages are messages from Windows that instruct the program to take some action. The facility processes create, size, paint, and command operating system messages.

a. WM_CREATE

Figure 19:
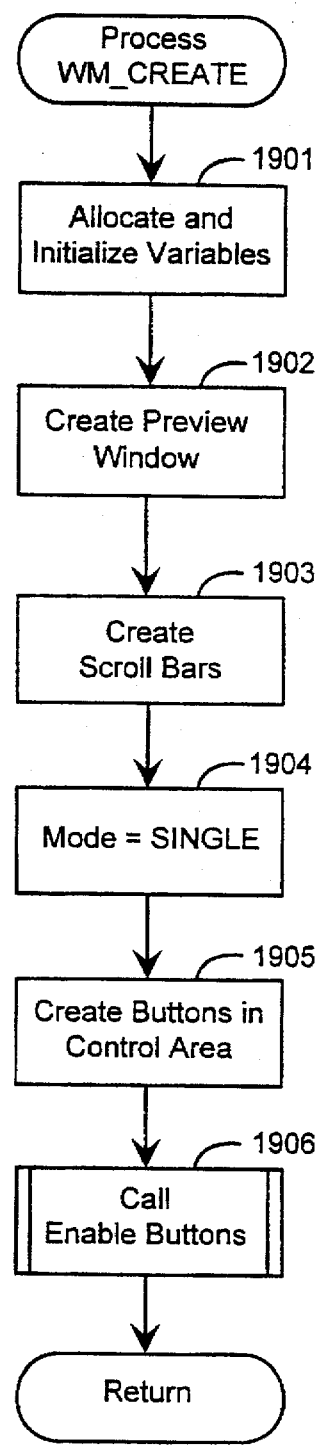
FIG. 19 is a flow diagram of the processing of a WM_CREATE message.

A WM_CREATE message indicates that the message processing loop should perform any allocation and initialization necessary. It is the first message that the facility will receive. FIG. 19 is a flow diagram of the processing of a WM_CREATE message. This diagram corresponds to step 1315 of the message processing loop. In step 1901, the facility allocates and initializes the variables it will use. In step 1902, the facility creates the preview window. In step 1903, the facility creates the scroll bars. In step 1904, the facility sets the current mode, stored in the variable Mode, equal to single page mode. In step 1905, the facility creates the buttons in the control area of the preview window. In step 1906, the facility calls the support subroutine EnableButtons, in order to enable or disable each button, as is appropriate. The process then returns.

b. WM_SIZE

Figure 20:
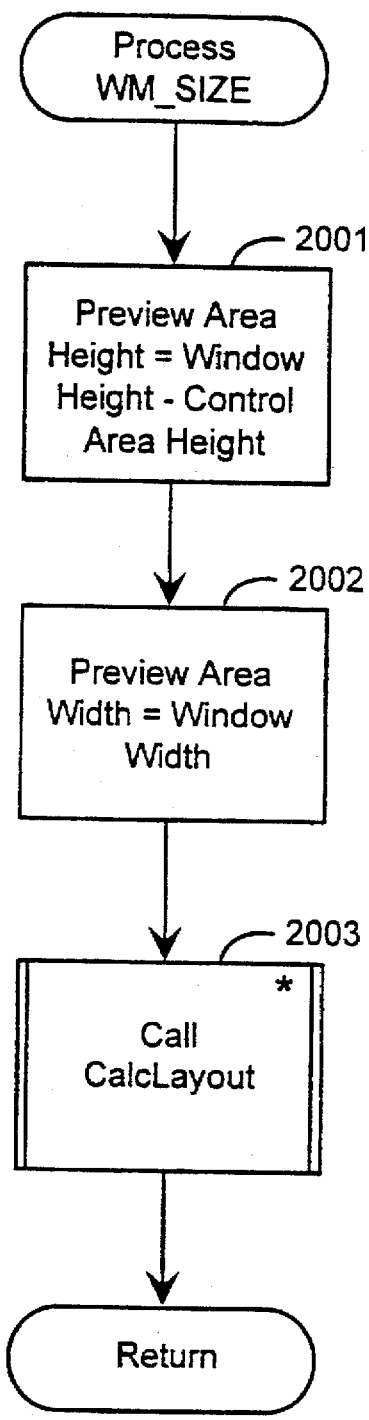
FIG. 20 is a flow diagram of the processing of a WM_SYSCHAR message.

A WM_SIZE message indicates that the user has changed the size of the preview window. FIG. 20 is a flow diagram of the processing of a WM_SYSCHAR message. This diagram corresponds to step 1317 of the message processing loop. In this process, the facility redisplays preview window contents to fit within the new window size.

In step 2001, the facility calculates the new preview area height. The result is given by the following expression: (preview window height)–(control area height). In step 2002, the process sets the preview area width equal to the preview window width. In step 2003, the facility calls the utility subroutine CalcLayout, shown in FIGS. 24A–E, in order to calculate the new layout of the preview area contents. The process then returns.

c. WM_PAINT

Figure 21A:
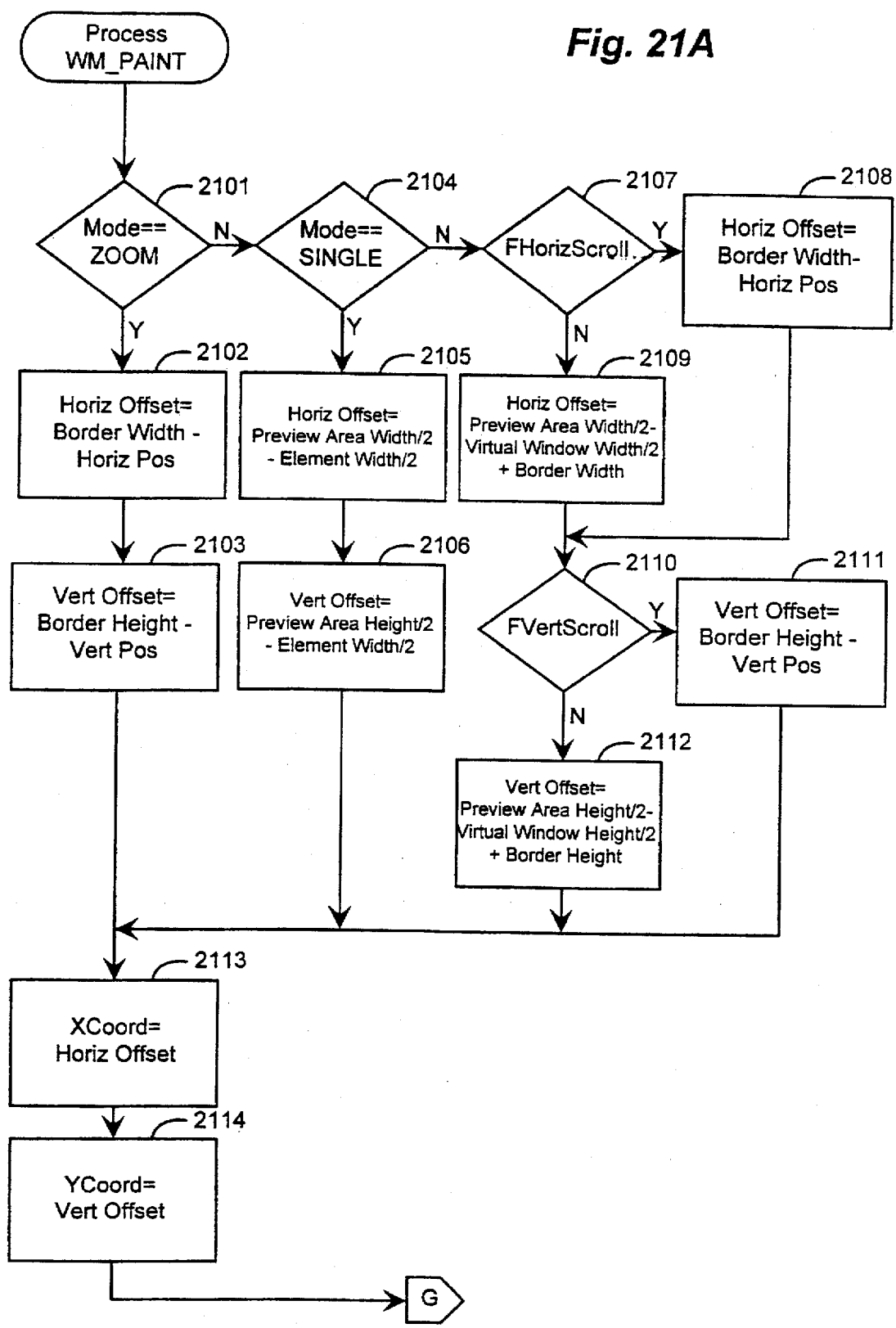
FIGS. 21A–21B are a flow diagram of the processing of a WM_COMMAND message.
Figure 21B:
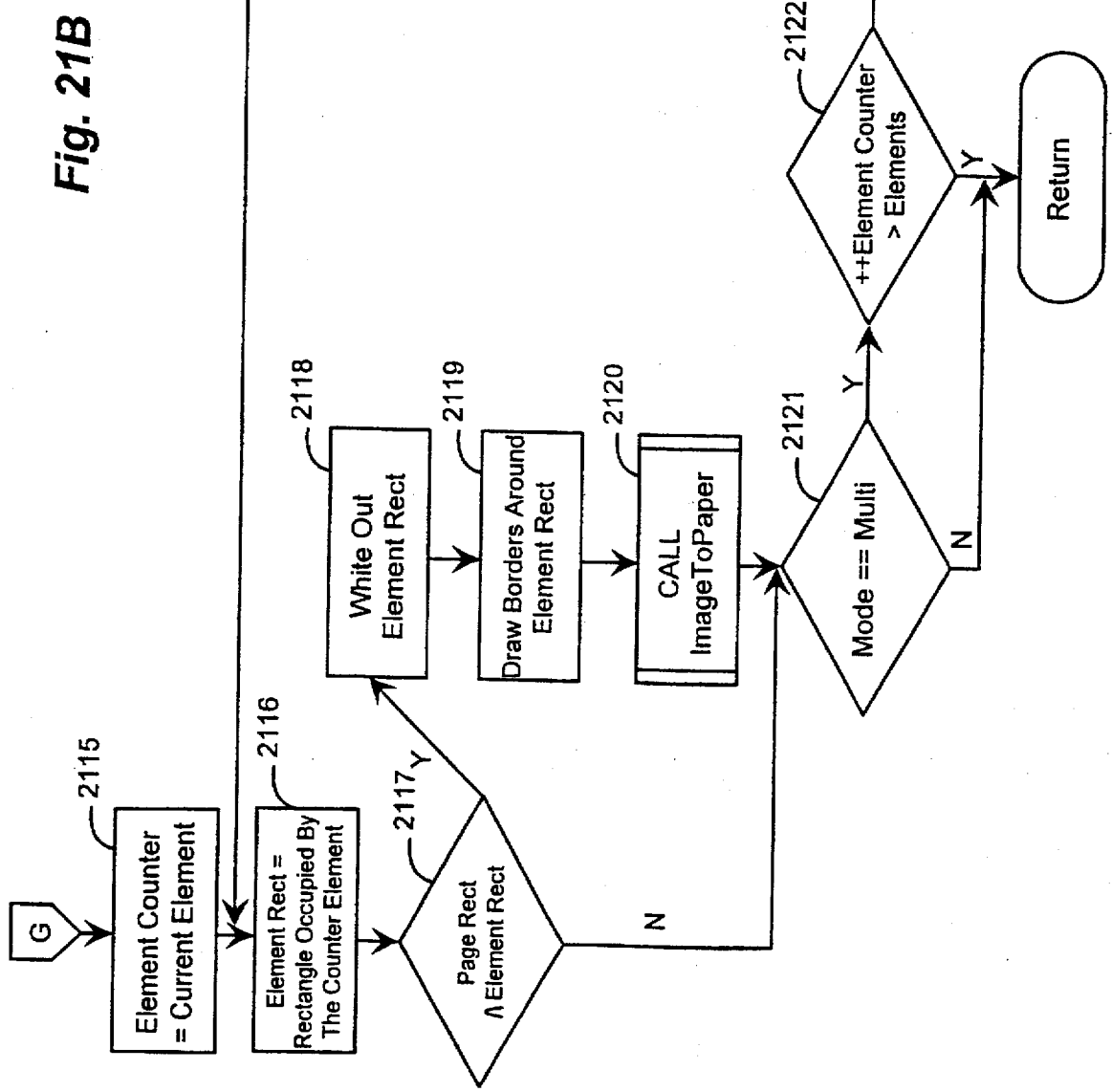

A WM_PAINT message indicates that a region of the preview window needs to be redrawn. This region is called the paint rectangle. FIGS. 21A–21B are a flow diagram of the processing of a WM_COMMAND message. This diagram corresponds to step 1319 of the message processing loop. In this process, the facility calculates the offset from the upper left hand corner of the preview area to the upper left hand corner of the upper left-most element, then draws each element that intersects with the paint rectangle.

In steps 2101–2112, the facility calculates the proper offset. In step 2101, if the current mode is zoom mode, then the facility continues at step 2102, else the facility continues at step 2104. In steps 2102–2103, the facility calculates the offset for zoom mode. In step 2102, the facility calculates the horizontal offset. The result is given by the following expression: (width of the border surrounding the sole element in the virtual window)–(the horizontal component of the preview position). In step 2103, the facility calculates the vertical offset. The result is given by the following expression: (height of the border surrounding the sole element in the virtual window)–(the vertical component of the preview position).

In step 2104, if the current mode is single page mode, then the facility continues at step 2105, else the facility continues at step 2107. In steps 2105–2106, the facility calculates the offset for single page mode. In step 2105, the facility calculates the horizontal offset. The result is given by the following expression: (preview area width)/2–(element width)/2. In step 2106, the facility calculates the vertical offset. The result is given by the following expression: (preview area height)/2–(element height)/2.

In steps 2107–2112, the facility calculates the offset for multiple page mode. In step 2107, if the horizontal scrolling is enabled, then the facility continues at step 2108, else the facility continues at step 2109. In step 2108, the facility calculates the horizontal offset with horizontal scrolling. The result is given by the following expression: (width of the border surrounding the elements in the virtual window)–(the horizontal component of the preview position). In step 2109, the facility calculates the horizontal offset without horizontal scrolling. The result is given by the following expression: (preview area width)/2–(virtual window width)/2+(width of the border surrounding the elements in the virtual window).

In step 2110, if the vertical scrolling is enabled, then the facility continues at step 2111, else the facility continues at step 2112. In step 2111, the facility calculates the vertical offset with vertical scrolling. The result is given by the following expression: (height of the border surrounding the elements in the virtual window)–(the vertical component of the preview position). In step 2112, the facility calculates the vertical offset without vertical scrolling. The result is given by the following expression: (preview area height)/2–(virtual window height)/2+(height of the border surrounding the elements in the virtual window).

In steps 2113–2114, the facility sets the coordinates of the upper left hand corner of the upper left-most element (variables XCoord and YCoord), to the offsets. In step 2113, the facility sets XCoord equal to the horizontal offset. In step 2114, the facility sets YCoord equal to the vertical offset. The facility then continues through junction G at step 2115.

In step 2115, the facility sets a counter variable called ElementCounter to designate the current element. The current element is the sole element in the current virtual window in either zoom or single page mode, and the upper left-most element in the current virtual window in multiple page mode.

In steps 2116–2120, the facility draws the element designated by ElementCounter, if necessary. In step 2116, the facility sets a variable called ElementRect to designate the rectangle occupied by the element designated by ElementCounter. In step 2117, if ElementRect intersects with the paint rectangle, then the facility continues at step 2118, else the facility continues at step 2121.

In steps 2118–2120, the facility actually draws the element designated by ElementCounter. In step 2118, the facility fills ElementRect with white. In step 2119, the facility draws dark borders around ElementRect. In step 2120, the facility calls the ImageToPaper function to draw the element designated by ElementCounter inside ElementRect. This function corresponds to step 1211 of the application program. It uses the variables HorizMagn and VertMagn, calculated by CalcLayout, to scale the element to the correct size.

In steps 2121–2122, the facility determines whether it should consider other elements for drawing. In step 2121, if the current mode is multiple page mode then the facility continues at step 2122, else the process returns. In step 2122, if the incremented ElementCounter is greater than the total number of elements, then the process returns, else the facility continues at step 2123.

In step 2123, the facility updates the variables XCoord and YCoord to correspond to the upper left hand corner of the element designated by the new value of ElementCounter. If this element is at the top of a new column, then YCoord= (vertical offset) and XCoord= XCoord+(element width)+ (element spacing width), else YCoord=YCoord+(element height)+(element spacing height) and XCoord does not change. The facility then continues at step 2116 to draw the element designated by the new value of ElementCounter, if necessary.

d. WM_COMMAND

Figure 22:
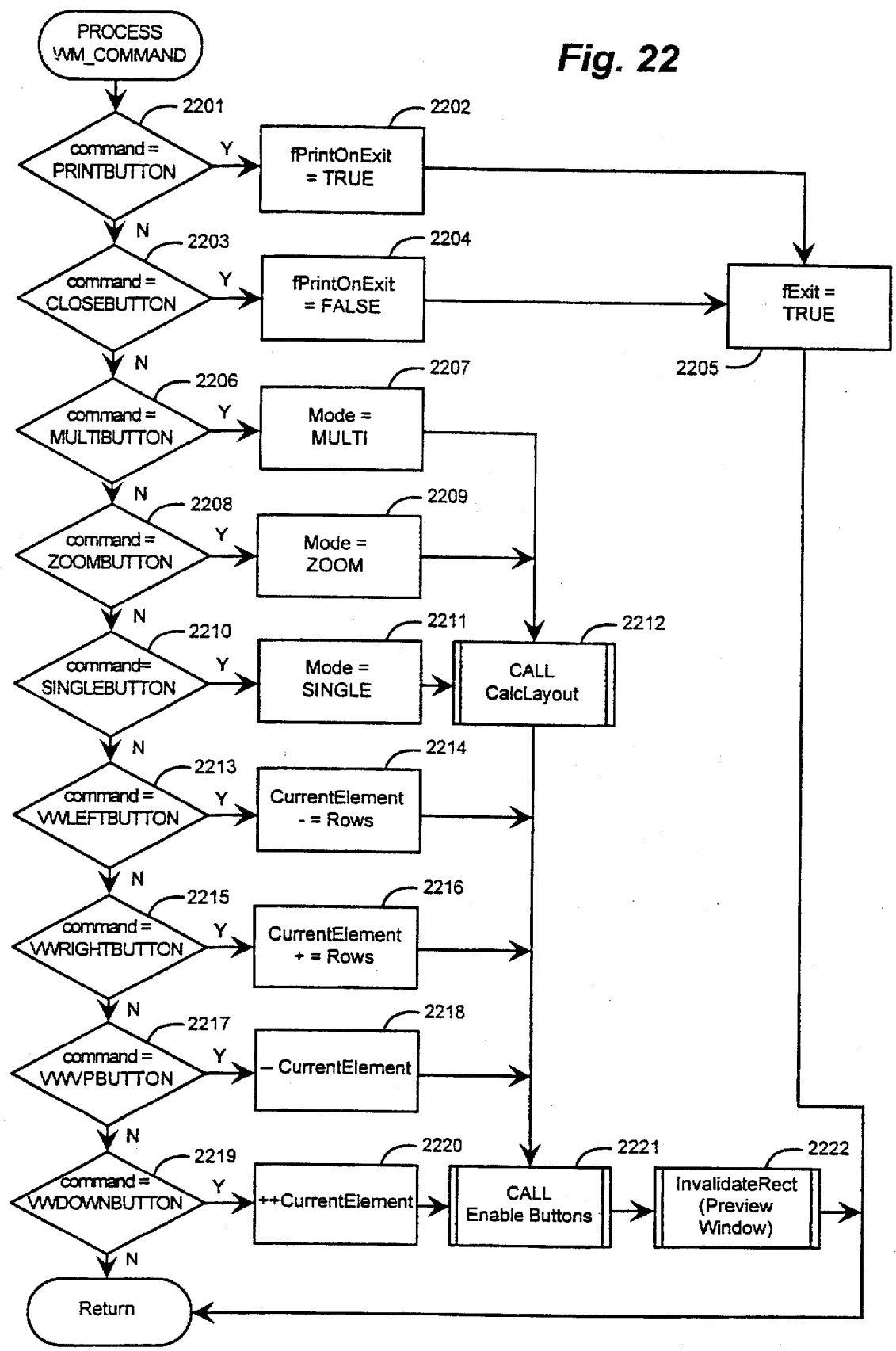
FIG. 22 is a flow diagram of the processing of a WM_COMMAND message.

A WM_COMMAND message indicates that a display button has been pressed. It contains a command code (stored in a Command variable) that specifies the particular button pressed. This message can be posted either by Windows, with respect to buttons that it manages, or by the facility in step 1307, with respect to buttons that the facility manages itself. The message can be posted in response to an actual button press, or to a keystroke equivalent thereof. FIG. 22 is a flow diagram of the processing of a WM_COMMAND message. This diagram corresponds to step 1321 of the message processing loop.

In steps 2201–2205, if Command contains either PRINTBUTTON or CLOSEBUTTON, then the facility sets the exit flag, fExit, which causes the message processing loop to terminate and execution of the facility to conclude. In step 2201, if Command contains PRINTBUTTON, then the facility continues at step 2202, else the facility continues at step 2203. In step 2202, the facility sets the print on exit flag, fPrintOnExit, so that after execution of the preview facility concludes, the print facility prints the document. After executing step 2202, the facility continues at step 2205. In step 2203, if Command contains CLOSEBUTTON, then the facility continues at step 2204, else the facility continues at step 2206. In step 2204, the facility clears the print on exit flag, fPrintOnExit, so that the document is not printed. After executing step 2205, the process returns.

In steps 2206–2212, if Command contains either MULTIBUTTON, ZOOMBUTTON, or SINGLEBUTTON, then the facility sets the Mode variable and recalculates the preview area layout. In step 2206, if Command contains MULTIBUTTON, then the facility continues at step 2207 to set the current mode equal to multiple page mode, else the facility continues at step 2208. After executing step 2207, the facility continues at step 2212. In step 2208, if Command contains ZOOMBUTTON, then the facility continues at step 2209 to set the current mode equal to zoom mode, else the facility continues at step 2210. After executing step 2209, the facility continues at step 2212. In step 2210, if Command contains SINGLEBUTTON, then the facility continues at step 2211 to set the current mode equal to single page mode, else the facility continues at step 2213. In step 2212, the facility calls the support subroutine CalcLayout, shown in FIGS. 24A–E, in order to recalculate the preview area layout.

In steps 2213–2220, if Command contains either VWLEFTBUTTON, VWRIGHTBUTTON, VWUPBUTTON, or VWDOWNBUTTON, then the facility changes the current virtual window by changing the value of the CurrentElement variable. In step 2213, if Command contains VWLEFTBUTTON, then the facility continues at step 2214 to subtract the number of rows from CurrentElement, else the facility continues at step 2215. After executing step 2214, the facility continues at step 2221. In step 2215, if Command contains VWRIGHTBUTTON, then the facility continues at step 2216 to add the number of rows to CurrentElement, else the facility continues at step 2217. After executing step 2216, the facility continues at step 2221. In step 2217, if Command contains VWUPBUTTON, then the facility continues at step 2218 to decrement CurrentElement, else the facility continues at step 2219. After executing step 2218, the facility continues at step 2221. In step 2219, if Command contains VWDOWNBUTTON, then the facility continues at step 2218 to increment CurrentElement, else the process returns.

Figure 23:
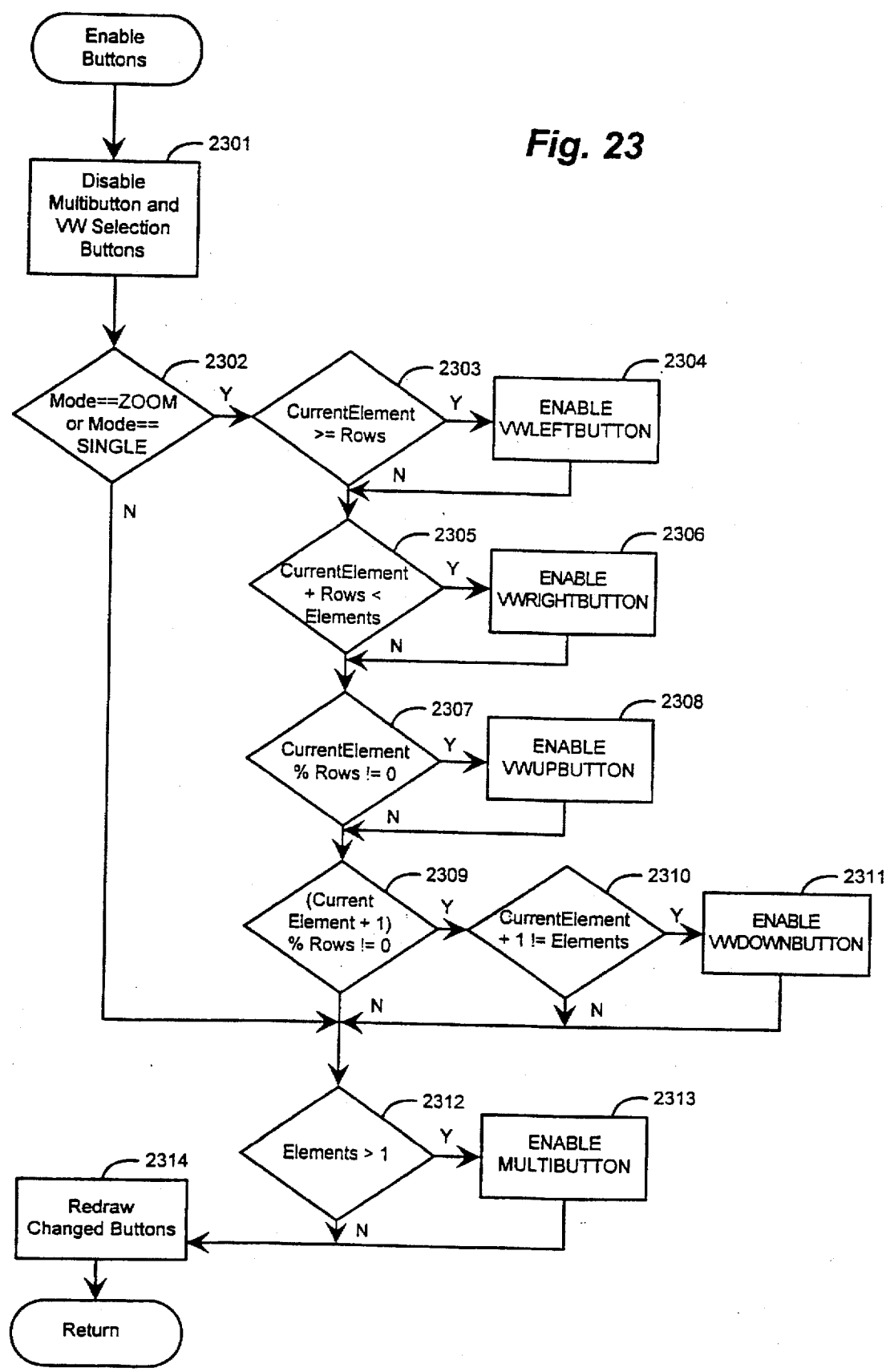
FIG. 23 is a flow diagram of EnableButtons.
Figure 24A:
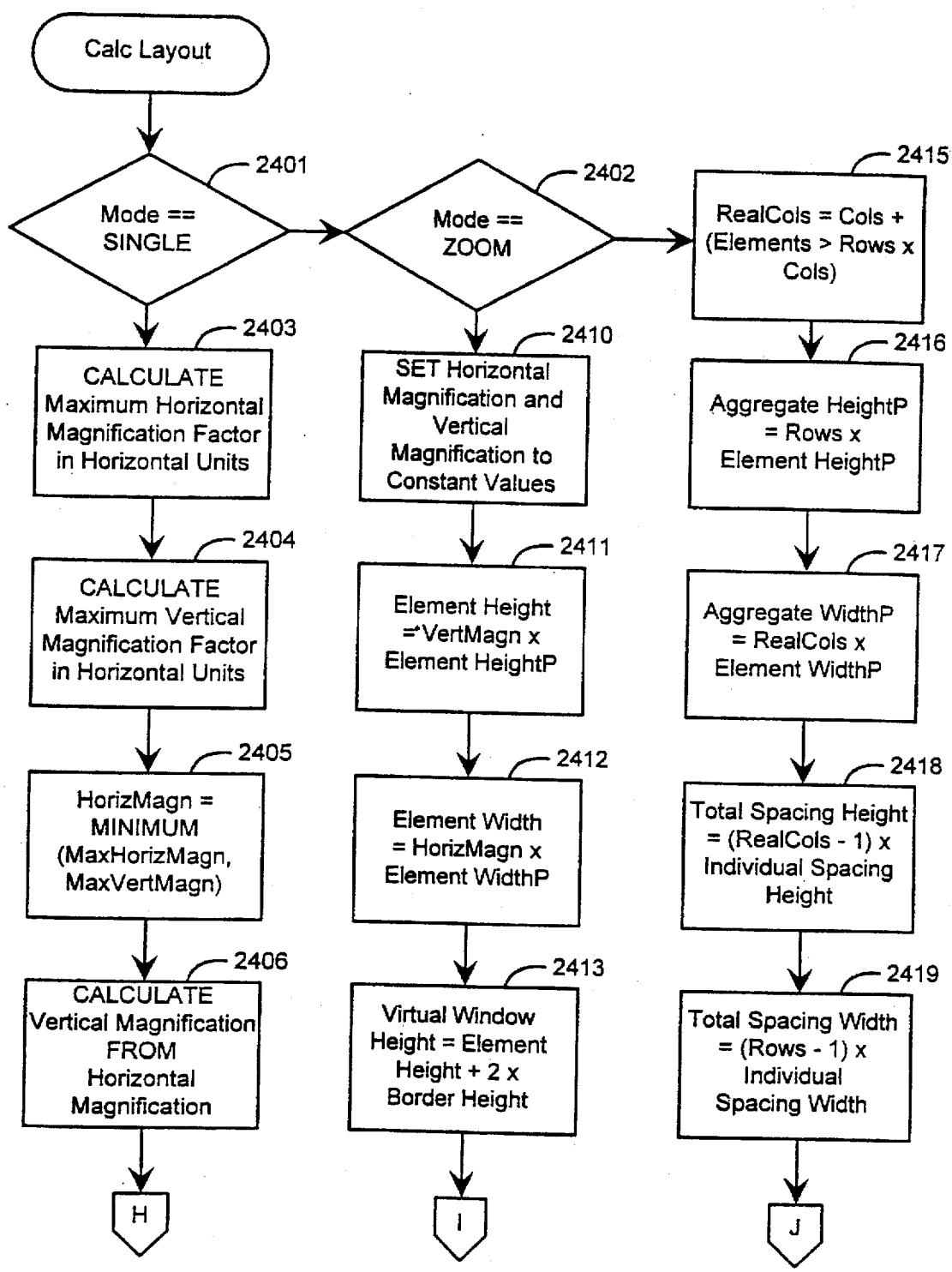
FIGS. 24A–24E are a flow diagram of CalcLayout.
Figure 24B:
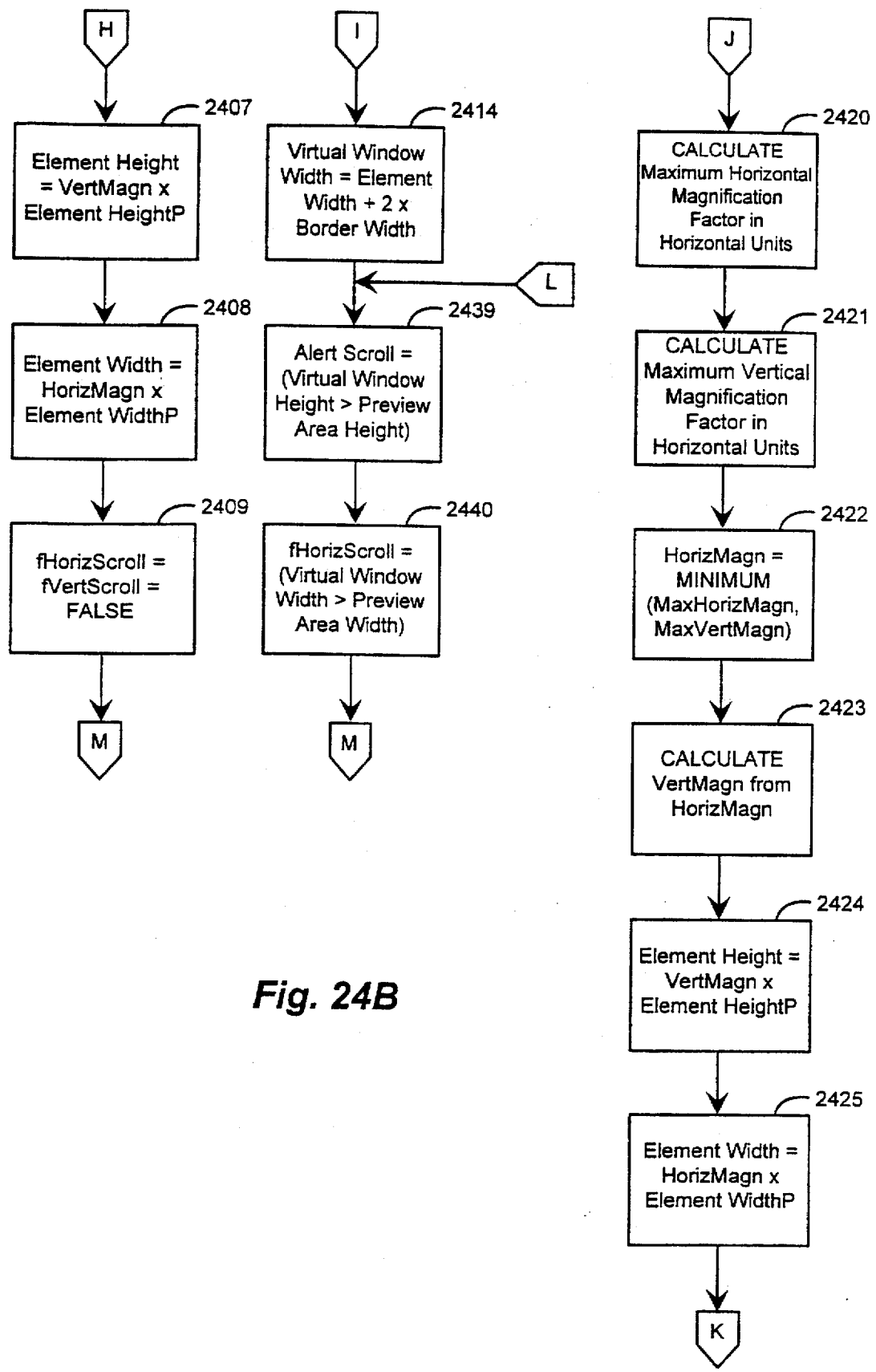
Figure 24C:
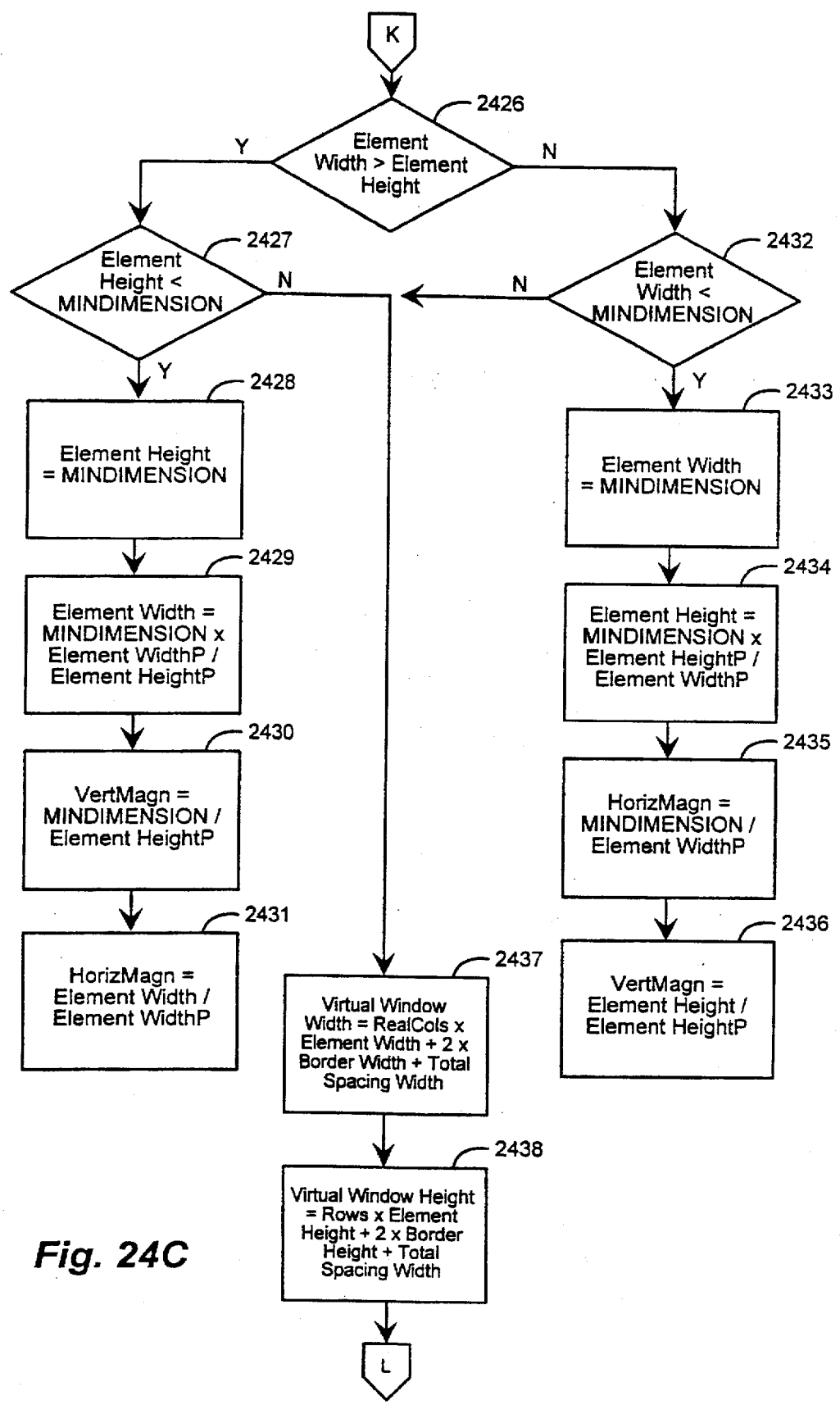
Figure 24D:
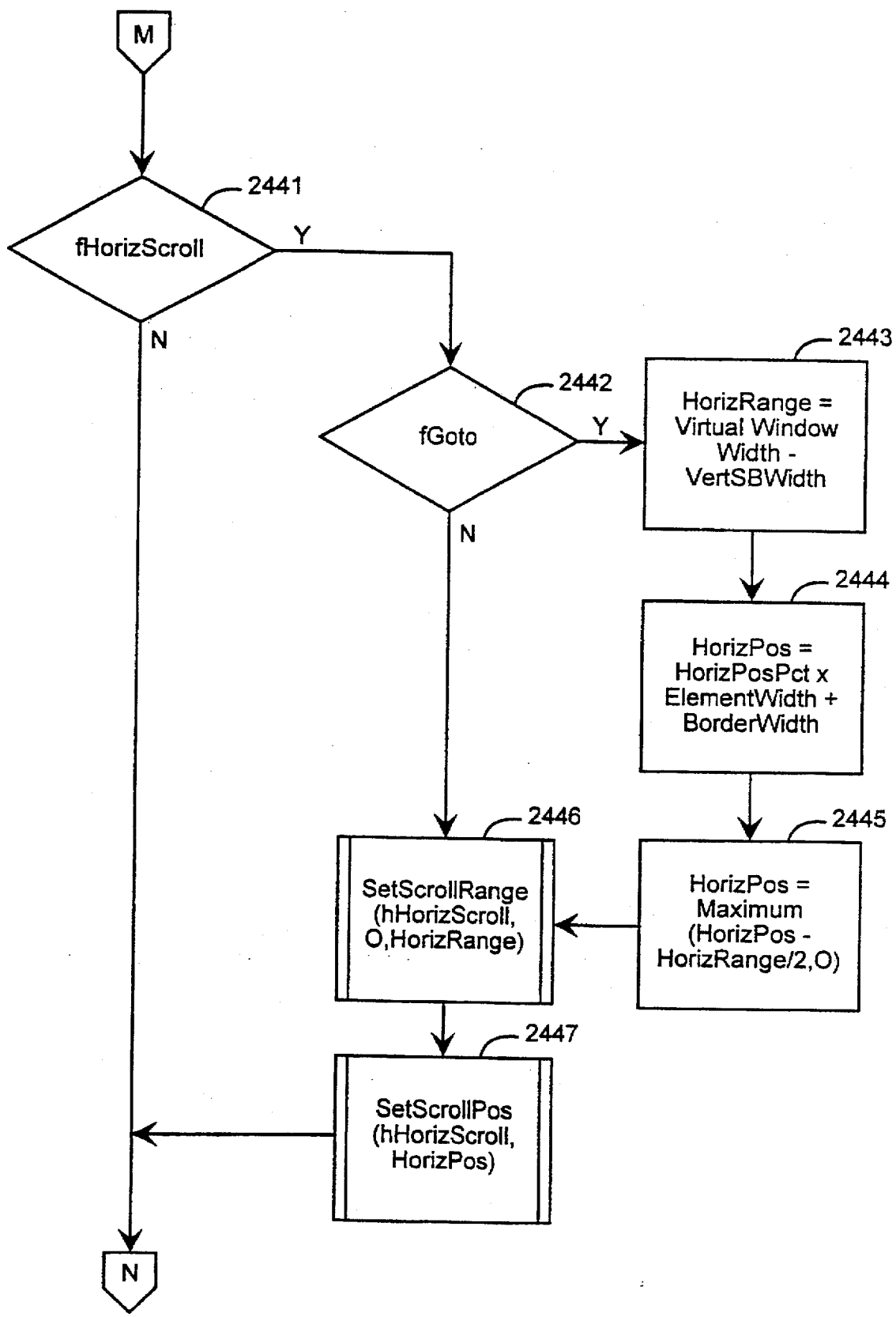
Figure 24E:
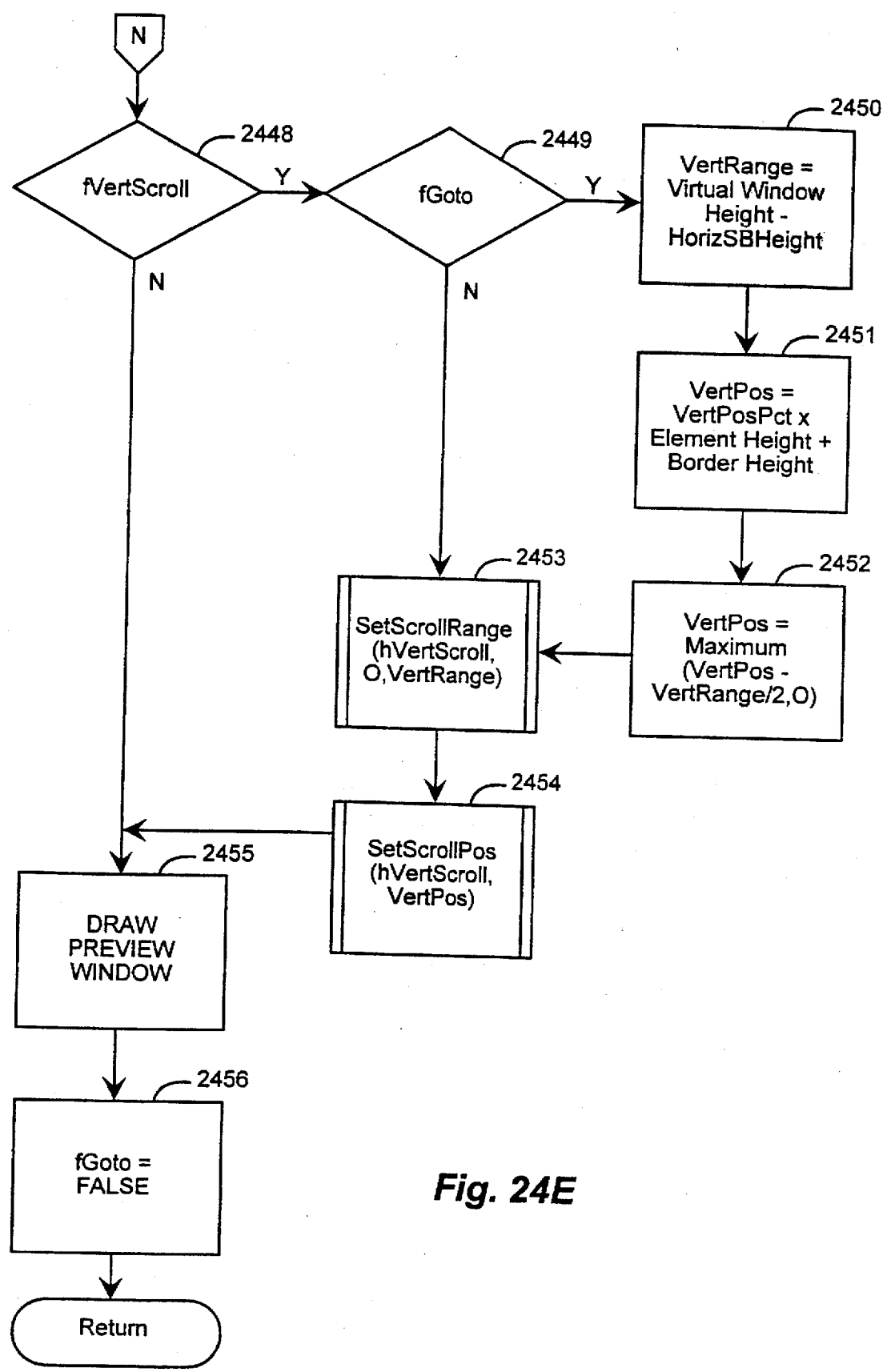

In step 2221, the facility calls the support subroutine EnableButtons, shown in FIG. 23, in order to enable or disable each button, as is appropriate. In step 2222, the facility calls the Windows function InvalidateRect, in order to invalidate the entire preview area. InvalidateRect posts a WM_PAINT message to the facility, telling it to redraw the preview area. This message is processed in step 1319 of the message processing loop. The process then returns.

Those skilled in the art of event driven programming will recognize that there are other messages that a program could receive, and that many programs process these other messages identically, in a way that is well known in the art.

C. SUPPORT SUBROUTINES

Support subroutines are those called by at least one message processing to provide process to provide compartmentalized services. Compartmentalized services include enabling and/or disabling buttons and calculating the layout of the preview area.

1. EnableButtons

In EnableButtons, the facility enables or disables each button, as is appropriate. The subroutine is called during the processing of WM_CREATE and WM_COMMAND messages. FIG. 23 is a flow diagram of EnableButtons. In step 2301, the facility preliminarily disables the multiple page mode button and all of the virtual window selection buttons. In step 2302, if the current mode is either zoom mode or single page mode, then the facility continues at step 2303, else the facility continues at step 2309.

In steps 2303–2311, the facility determines whether it should enable each of the virtual window selection buttons. These determination depend on the CurrentElement variable, which contains the number of the current element, beginning at zero at the upper left-most element and counting upward while traveling first down, then to the right. In step 2303, if the current element number is greater than or equal to the number of rows, then the current element is not in the leftmost column, and the facility continues at step 2304 to enable the VWLEFTBUTTON, else the facility continues at step 2305. In step 2305, if the current element number plus the number of rows is less than the number of elements, then the current element is not in the rightmost column, and the facility continues at step 2306 to enable the VWRIGHTBUTTON, else the facility continues at step 2307. In step 2307, if the current element number is not a multiple of the number of rows (CurrentElement % Rows !=0), then the current element is not in the topmost row, and the facility continues at step 2308 to enable the VWUPBUTTON, else the facility continues at step 2309. In step 2309, if the current element number is not one less than a multiple of the number of rows ((CurrentElement+1) % Rows !=0), then the facility continues at step 2310, else the facility continues at step 2312. In step 2310, if the current element number is not one less than the number of elements, then the current element is not in the bottommost row, and the facility continues at step 2310 to enable the VWDOWNBUTTON, else the facility continues at step 2312.

In step 2312, if the number of elements is greater than one, then the facility continues at step 2313 to enable the multiple page mode button, else the facility continues at step 2314. In step 2314, the facility redraws any changed buttons. The subroutine then returns.

2. CalcLayout

In CalcLayout, the facility calculates several values required to display the contents of the preview area. The subroutine is called during the processing of WM_SIZE, WM_PAINT, and WM_COMMAND messages. FIGS. 24A–24E are a flow diagram of CalcLayout.

In step 2401, if the current mode is single page mode, then the facility continues at step 2403, else the facility continues at step 2402. In step 2402, if the current mode is zoom mode, then the facility continues at step 2403, else the current mode is multiple page mode and the facility continues at step 2403.

In steps 2403–2409, the facility calculates magnification factors, element height, and element width, and sets the scrolling flags for single page mode. In steps 2403–2406, the facility calculates horizontal and vertical magnification factors. In step 2403, the facility calculates the maximum horizontal magnification factor in horizontal units. The result is given by the following expression: (preview area width)/(actual element width). In step 2404, the facility calculates the maximum vertical magnification factor in horizontal units. The result is given by the following expression: (preview area height)/(actual element height), (display x-to-y aspect ratio)/(printer x-to-y aspect ratio). An aspect ratio is the ratio of horizontal pixel density to vertical pixel density for a particular output device. In step 2405, the facility sets the horizontal magnification factor, HorizMagn, equal to the smaller of maximum horizontal magnification or maximum vertical magnification, both expressed in horizontal units. If maximum horizontal magnification is used, it is said that the view is x-constrained, whereas if maximum horizontal magnification is used, it is said that the view is y-constrained. In step 2406, the facility calculates the vertical magnification factor from the horizontal magnification factor. The result is given by the following expression: (horizontal magnification factor)*(printer x-to-y aspect ratio)/(display x-to-y aspect ratio). After executing step 2406, the facility continues through junction H at step 2407.

In steps 2407–2409, the facility calculates element height and width, and sets the scrolling flags. In step 2407, the facility sets element height equal to the following expression: (vertical magnification factor)*(actual element height). In step 2408, the facility sets element width equal to the following expression: (horizontal magnification factor)*(actual element width). In step 2409, the facility clears both the horizontal scroll flag and the vertical scroll flag, fHorizScroll and fVertScroll. After executing step 2409, the facility continues through junction M at step 2441.

In steps 2410–2414, the facility sets magnification factors, element dimensions, and virtual window dimensions for zoom mode. In step 2410, the facility sets the horizontal and vertical magnification factors to constant values predetermined to make the image of the element the same size as the actual element. In step 2411, the facility sets element height equal to the following expression: (vertical magnification factor)*(actual element height). In step 2412, the facility sets element width equal to the following expression: (horizontal magnification factor)*(actual element width). In step 2413, the facility sets virtual window height equal to the following expression: (element height)+2*(height of the border surrounding the displayed element). After executing step 2413, the facility continues through junction I at step 2414. In step 2414, the facility sets virtual window width equal to the following expression: (element width)+2*(width of the border surrounding the displayed element). After executing step 2414, the facility continues at step 2439.

In steps 2415–2438, the facility calculates horizontal and vertical magnification factors for multiple page mode. In steps 2415–2523, the facility preliminarily calculates horizontal and vertical magnification factors. In step 2415, the facility sets the variable RealCols equal to the number of columns in the grid, and increases it by one if the total number of elements is larger than the product of rows in the grid and columns in the grid.

In step 2416, the facility calculates the height of the actual array of elements, when the actual sheets are arranged in a grid. The result is given by the following expression: (number of rows)*(actual element height). In step 2417, the facility calculates the width of the actual array of elements, when the actual sheets are arranged in a grid. The result is given by the following expression: RealCols*(actual element width).

In step 2418, the facility calculates the total height of the spacing between elements in the virtual window. The result is given by the following expression: (RealCols−1)* (individual spacing height). The individual spacing height, like the individual spacing width, is a constant number of pixels. In step 2419, the facility calculates the total width of the spacing between elements in the virtual window. The result is given by the following expression: ((number of rows)−1)*(individual spacing width). After executing step 2419, the facility continues through junction J at step 2420.

In step 2420, the facility calculates the maximum horizontal magnification factor in horizontal units. The result is given by the following expression: ((preview area width)−(total horizontal spacing))/(height of the actual array of elements). In step 2421, the facility calculates the maximum vertical magnification factor in horizontal units. The result is given by the following expression: ((preview area height)−(total vertical spacing))/(height of the actual array of elements)*(display x-to-y aspect ratio)/(printer x-to-y aspect ratio). An aspect ratio is the ratio of horizontal pixel density to vertical pixel density for a particular output device. In step 2422, the facility sets the horizontal magnification factor, HorizMagn, equal to the smaller of maximum horizontal magnification or maximum vertical magnification, both expressed in horizontal units. If maximum horizontal magnification is used, it is said that the view is x-constrained, whereas if maximum horizontal magnification is used, it is said that the view is y-constrained. In step 2423, the facility calculates the vertical magnification factor from the horizontal magnification factor. The result is given by the following expression: (horizontal magnification factor)* (printer x-to-y aspect ratio)/(display x-to-y aspect ratio).

In steps 2424–2425, the facility calculates element height and width. In step 2424, the facility sets element height equal to the following expression: (vertical magnification factor)*(actual element height). In step 2425, the facility sets element width equal to the following expression: (horizontal magnification factor)*(actual element width). After executing step 2425, the facility continues through junction K at step 2426.

In steps 2426–2538, the facility increases the magnification factors, if necessary, so that neither element dimension is too small. In step 2426, if element width is greater than element height, then the facility continues at step 2427, else the facility continues at step 2432.

In step 2427, if element height is less than the minimum element dimension, MINDIMENSION, then the facility continues at step 2428, else the facility continues at step 2437. In steps 2428–2431, the facility reduces the magnification factors such that element height becomes MINDIMENSION. In step 2428, the facility sets element height equal to MINDIMENSION. In step 2429, the facility calculates a new element width. The result is given by the following expression: MINDIMENSION*(actual element width)/(actual element height). In step 2430, the facility calculates a new vertical magnification factor. The result is given by the following expression: MINDIMENSION/ (actual element height). In step 2431, the facility calculates a new horizontal magnification factor. The result is given by the following expression: (element width)/(actual element width). After executing step 2431, the facility continues at step 2437.

In step 2432, if element width is less than the minimum element dimension, MINDIMENSION, then the facility continues at step 2433, else the facility continues at step 2437. In steps 2433–2436, the facility reduces the magnification factors such that element width becomes MINDIMENSION. In step 2428, the facility sets element width equal to MINDIMENSION. In step 2429, the facility calculates a new element height. The result is given by the following expression: MINDIMENSION*(actual element height)/(actual element width). In step 2430, the facility calculates a new horizontal magnification factor. The result is given by the following expression: MINDIMENSION/ (actual element width). In step 2431, the facility calculates a new vertical magnification factor. The result is given by the following expression: (element height)/(actual element height).

In step 2437, the facility calculates virtual window width. The result is given by the following expression: RealCols , (element width)+2*(width of the border around the elements)+(total spacing width). In step 2438, the facility calculates virtual window height. The result is given by the following expression: (number of rows)*(element height)+ 2*(height of the border around the elements)+(total spacing height). After executing step 2438, the facility continues through junction L at step 2439.

In steps 2439–2440, the facility sets or clears the vertical scroll flag and the horizontal scroll flag. In step 2439, the facility sets the vertical scroll flag, fVertScroll equal to the following expression: (virtual window height)>(preview area height). In step 2440, the facility sets the horizontal scroll flag, fHorizScroll equal to the following expression: (virtual window width)>(preview area width). After executing step 2440, the facility continues through junction M at step 2441.

In step 2441, if the horizontal scroll flag is true, then the facility continues at step 2442, else the facility continues at step 2448. In steps 2442–2847, the facility sets the horizontal scrolling range and position. In step 2442, if the fGoto flag is true, then the facility continues at step 2443, else the facility continues at step 2446.

In steps 2443–2445, the facility calculates a new horizontal scrolling range and position. In step 2443, the facility calculates a new horizontal range, HorizRange. The result is given by the following expression: (virtual window width)−(width of the vertical scroll bar). In step 2444, the facility calculates a new horizontal position, HorizPos. The result is given by the following expression: (percentile horizontal position)*(element width)+(width of the border around the elements). In step 2445, the facility adjusts the new horizontal position by subtracting one-half of the new horizontal range. If that value is negative, then the new horizontal position is set equal to zero.

In step 2446, the facility calls the Windows function SetScrollRange for the horizontal scroll bar with the value of HorizRange. In step 2447, the facility calls the Windows function SetScrollPos for the horizontal scroll bar with the value of HorizPos. After executing step 2447, the facility continues through junction N at step 2448.

Steps 2448–2454 are the vertical analog of steps 2441–2447. In step 2948, if the vertical scroll flag is true, then the facility continues at step 2449, else the facility continues at step 2455. In steps 2449–2854, the facility sets the vertical scrolling range and position. In step 2449, if the fGoto flag is true, then the facility continues at step 2450, else the facility continues at step 2453.

In steps 2450–2452, the facility calculates a new vertical scrolling range and position. In step 2450, the facility calculates a new vertical range, VertRange. The result is given by the following expression: (virtual window height)−(height of the horizontal scroll bar). In step 2451, the facility calculates a new vertical position, VertPos. The result is given by the following expression: (percentile vertical position)*(element height)+(height of the border around the elements). In step 2452, the facility adjusts the new vertical position by subtracting one-half of the new vertical range. If that value is negative, then the new vertical position is set equal to zero.

In step 2453, the facility calls the Windows function SetScrollRange for the vertical scroll bar with the value of VertRange. In step 2454, the facility calls the Windows function SetScrollPos for the vertical scroll bar with the value of VertPos.

In step 2455, the facility draws the preview window. This involves calling the Windows function ShowWindow to place the window on the display and Windows function UpdateWindow to draw the window contents. In step 2456, the facility clears the fGoto flag. The subroutine then returns.

V. EXAMPLE

The facility's response to the following sequence of actions by the user of an application containing the facility is described.

A. Issue Preview Document Command

When the user issues the preview document command while generating the document shown in FIGS. 9–11, the application moves from step 1205 to step 1209, in which it produces an intermediate version of the document. In step 1210, the application invokes the preview facility to preview the intermediate form.

When the application invokes the preview facility, Windows posts two messages to the facility's message processing loop: WM_CREATE and WM_PAINT. The facility processes the WM_CREATE message in step 1315 of the message processing loop, allocating and initializing the facility's variables, setting the current preview mode to single page mode, and doing other preliminary processing. The facility then processes the WM_PAINT message in step 1319 of the message processing loop, drawing the upper left-most element in the preview area. After this action, the facility is left in single page mode, displaying the upper left-most element at the largest magnification factor that the size of the preview window will allow. This state corresponds to FIG. 9.

B. Press Multiple Page Mode Button

Pressing the multiple page mode button causes Windows to post two messages to the facility's message processing loop: WM_LBUTTONDOWN and WM_LBUTTONUP. The facility processes the WM_LBUTTONDOWN message in step 1303 of the message processing loop, pushing the multiple page mode button down, pushing the single page mode button up, and setting the variable TrackButton to designate the multiple page mode button. The facility then processes the WM_LBUTTONUP message in step 1307 of the message processing loop, posting a WM_COMMAND message with the parameter MULTIBUTTON.

The facility processes the WM_COMMAND message in step 1321 of the message processing loop, changing the current mode to multiple page mode, calling the support subroutine CalcLayout in order to recalculate the layout of the preview area, calling the support subroutine EnableButtons in order to enable or disable each button, and causing the preview area to be redrawn. In CalcLayout, the facility arranges the elements in a two-dimensional array and computes the largest magnification factor at which the entire array can be displayed. In EnableButtons, the facility enables all of the buttons except the virtual window selection buttons, as there is only one virtual window in multiple page mode. Finally, the facility calls InvalidateRect, which causes Windows to post a WM_PAINT message. The facility processes the WM_PAINT message in step 1319, redrawing the preview window. After this action, the facility is left in multiple page mode, displaying a two-dimensional array of all of the elements at the largest magnification factor that the size of the preview window will allow. This state corresponds to FIG. 10.

C. Type Zoom Button Equivalent

When the user types Alt-1, the zoom button keyboard equivalent, Windows posts a WM_SYSCHAR message to the facility's message processing loop. The facility processes the WM_SYSCHAR message in step 1311 of the message processing loop, pushing the zoom mode button down, pushing the multiple page mode button up, and posting a WM_COMMAND message with the parameter ZOOMBUTTON.

The facility processes the WM_COMMAND message in step 1321 of the message processing loop, as it did the WM_COMMAND message above. In step 1321, the facility changes the current mode to zoom mode, calls the support subroutine CalcLayout in order to recalculate the layout of the preview area, calls the support subroutine EnableButtons in order to enable or disable each button, and causes the preview area to be redrawn. In CalcLayout, the facility places the upper left-most element in the current virtual window by itself, sets the magnification factor equal to one, enables both scroll bars, and sets the preview position to the upper left hand corner of the current virtual window. In EnableButtons, the facility enables all of the buttons except the upward and leftward virtual window selection buttons, as no virtual windows exist above or to the left of the current virtual window. Finally, the facility calls InvalidateRect, which causes Windows to post a WM_PAINT message. The facility processes the WM_PAINT message in step 1319, redrawing the preview window. After this action, the facility is left in zoom mode, displaying a the upper left hand corner of the upper left-most element. This state corresponds to FIG. 9.

D. Expand Window Size

When the user expands the window size to see more of the current virtual window, Windows posts a WM_SIZE message to the facility's message processing loop. The facility processes the WM_SIZE message in step 1317 of the message processing loop, calculating the new preview area size and calling the support subroutine CalcLayout in order to recalculate the layout of the preview area.

As above, in CalcLayout, the facility places the upper left-most element in the current virtual window by itself, sets the magnification factor to a large predetermined value, enables both scroll bars, and sets the preview position to the upper left hand corner of the current virtual window. At the end of CalcLayout, the facility redraws the preview window using the new layout, and the extent of the element in the current virtual window expands downward and to the right.

E. Click in Preview Area

Clicking in the preview area causes Windows to post two messages to the facility's message processing loop: WM_LBUTTONDOWN and WM_LBUTTONUP. The facility processes the WM_LBUTTONDOWN message in step 1303 of the message processing loop, pushing down the single page mode button, pushing up the zoom mode button, disabling both scroll bars, and posting a WM_COMMAND message with the parameter SINGLEBUTTON.

The facility processes the WM_COMMAND message in step 1321 of the message processing loop, changing the current mode to single page mode, calling the support subroutine CalcLayout in order to recalculate the layout of the preview area, calling the support subroutine EnableButtons in order to enable or disable each button, and causing the preview area to be redrawn. In CalcLayout, the facility leaves the current element in the current virtual window and computes the largest magnification factor at which the entire element can be displayed. At the end of CalcLayout, the facility redraws the preview window using the new layout. In EnableButtons, the facility enables all of the buttons except the upward and leftward virtual window selection buttons, as no virtual windows exist above or to the left of the current virtual window.

The facility processes the WM_LBUTTONUP message in step 1307 of the message processing loop. The message is essentially ignored, as TrackButton is set to NONE, indicating that the buttondown did not occur inside a button. After this action, the facility is left in single page mode, displaying the upper left-most element at the largest magnification factor that the size of the preview window will allow. This state corresponds to FIG. 9.

F. Type Rightward Virtual Window Selection Button Equivalent

When the user types Alt-right arrow, the rightward virtual window selection button keyboard equivalent, Windows posts a WM_SYSKEYDOWN message to the facility's message processing loop. The facility processes the WM_SYSCHAR message in step 1309 of the message processing loop, posting a WM_COMMAND message with the VWRIGHTBUTTON parameter since the rightward virtual window selection button is enabled.

The facility processes the WM_COMMAND message in step 1321 of the message processing loop, moving the current virtual window one to the right, calling the support subroutine EnableButtons in order to enable or disable each button, and causing the preview area to be redrawn. In EnableButtons, the facility enables all of the buttons except the upward and rightward virtual window selection buttons, as no virtual windows exist above or to the right of the current virtual window. Finally, the facility calls InvalidateRect, which causes Windows to post a WM_PAINT message. The facility processes the WM_PAINT message in step 1319, redrawing the preview window. After this action, the facility is left in single page mode, displaying the upper right-most element at the largest magnification factor that the size of the preview window will allow.

G. Press Downward Virtual Window Selection Button

Pressing the downward virtual window selection button causes Windows to post two messages to the facility's message processing loop: WM_LBUTTONDOWN and WM_LBUTTONUP. The facility processes the WM_LBUTTONDOWN message in step 1303 of the message processing loop, pushing the downward virtual window selection button down and setting the variable TrackButton to designate the downward virtual window selection button.

The facility then processes the WM_LBUTTONUP message in step 1307 of the message processing loop, posting a WM_COMMAND message with the parameter VWDOWNBUTTON.

The facility processes the WM_COMMAND message in step 1321 of the message processing loop, moving the current virtual window one down, calling the support subroutine EnableButtons in order to enable or disable each button, and causing the preview area to be redrawn. In EnableButtons, the facility enables all of the buttons except the downward and rightward virtual window selection buttons, as no virtual windows exist below or to the right of the current virtual window. Finally, the facility calls InvalidateRect, which causes Windows to post a WM_PAINT message. The facility processes the WM_PAINT message in step 1319, redrawing the preview window. After this action, the facility is left in single page mode, displaying the lower right-most element at the largest magnification factor that the size of the preview window will allow.

H. Press Print Button

Since Windows manages the print button, when the user presses it, Windows posts a single WM_COMMAND message, with the parameter PRINTBUTTON. The facility processes the WM_COMMAND message in step 1321 of the message processing loop, setting the fPrintOnExit and fExit flags. The set fExit flag causes the message processing loop to end, and the application continues at step 1212. Since the fPrintOnExit flag is set, the application continues at step 1207 to produce a printer-ready version of the document. In step 1208, the application sends the printer-ready version to a printer, and loops back to step 1205 to resume generating the document.

While this invention has been shown and described with reference to preferred embodiments, it will be understood by those skilled in the art that various changes or modifications in form and detail may be made without departing from the spirit and scope of this invention. For instance, instead of pages, computer elements could correspond to parts of pages or groups of pages. Computer elements could also be text, drawings, or other markings to be applied to particular surfaces of a three-dimensional object.

We claim:

1. A method in a computer system for previewing computer output within a preview area, the preview area being within a display area, the method comprising the steps of:
   (a) dividing the computer output into elements each having a height and a width, such that all of the elements have substantially the same height and substantially the same width, and such that each ordered pair of adjacent elements constituting a first adjacent element and a second adjacent element has one of the following four adjacency properties, identified by directions: left, where the contents of the second adjacent element occur to the left of the contents of the first adjacent element in the computer output; right, where the contents of the second adjacent element occur to the right of the contents of the first adjacent element in the computer output; down, where the contents of the second adjacent element occur below the contents of the first adjacent element in the computer output; and up, where the contents of the second adjacent element occur above the contents of the first adjacent element in the computer output;
   (b) displaying within the preview area only a starting one of the elements;
   (c) displaying within the display area for each of the four adjacency properties, an element selection control selectable by a user comprising a bounded region bearing a visual indication of the direction of the adjacency property, wherein, if the starting element is the first adjacent element of an ordered pair of adjacent elements having the adjacency property, the element selection control is displayed in a manner indicating that the element selection control is enabled, and wherein, if the starting element is not the first adjacent element of any ordered pairs of adjacent elements having the adjacency property, the element selection control is displayed in a manner indicating that the element selection control is disabled;
   (d) detecting the selection of an element selection control; and
   (e) if the starting element is the first adjacent element of an ordered pair of adjacent elements having the adjacency property of the selected element selection control, displaying within the preview area only the second adjacent element of that ordered pair of adjacent elements.

2. The method of claim 1, further including the ordered steps of:
   making the element displayed in step (e) the new starting element; and repeating steps (b) through (e).

3. The method of claim 1 wherein the preview area has dimensions comprising a height and a width, further including the steps of:
   receiving a request to resize the preview area by changing at least one dimension of the preview area;
   resizing the preview area in accordance with the request; and
   redisplaying the element displayed in step (e) such that the element is displayed in the resized preview area and substantially occupies the entire resized preview area.

4. An apparatus for previewing a computer output onto a display device, said apparatus comprising:
   (a) means for dividing the computer output into a plurality of elements, each element representing a portion of the computer output for display on the display device;
   (b) means for ordering the elements of the computer output into a plurality of ordered pairs, each ordered pair comprising a first and second adjacent element having one of the four adjacency properties, identified by directions: left, where the second adjacent element is positioned the left of the first adjacent element; right, where the second adjacent element is positioned to the right of the first adjacent element; down, where the second adjacent element is positioned below the first adjacent pair; and up, where the second adjacent element is positioned above the first adjacent element;
   (c) means for selecting one element of an ordered pair;
   (d) a preview area for displaying only the selected element on the display device;
   (e) an element selection control for each of the adjacency properties, the element selection control comprising a bounded region bearing a visual indication of the direction of the adjacency property and which is selectable by a user for choosing the corresponding adjacent element of the selected element, each element selection control being displayed in an enabling manner when the selected element is the first adjacent element of the ordered pair having the adjacency property, each element selection control being displayed in a disabling manner when the selected element is not the first adjacent element having the adjacency property and the element selection control displayed on the display device;

(f) means for detecting a selection of the element selection control; and (g) means for displaying in the preview area only the entire element that is selected by said detecting means.

5. A computer-implemented method for previewing computer-generated output comprising a plurality of elements, each element representing an arrangement of data to be rendered as a page, each element having an adjoining horizontal element and an adjoining vertical element, comprising:

displaying only one of the plurality of elements on a display device;

displaying a control with a horizontal indication and a control with a vertical indication on the display device;

detecting selection of a displayed control;

when the control with the horizontal indication is selected, selecting an element that is an adjoining horizontal element to the displayed element;

when the control with the vertical indication is selected, selecting an element that is an adjoining vertical element to the displayed element; and displaying only the selected element on the display device whereby a user may preview the computer-generated output by selecting the displayed controls to individually display each of the plurality of elements.

6. A method in a computer system for selectively displaying portions of a computer document on a display device, said method comprising the steps of:

logically dividing the computer document into a plurality of rows and a plurality of columns, an intersection of each row and column being a portion of the document, each portion being logically contiguous to the portions in adjacent rows and columns, each portion representing data of the document that is to be rendered as a page;

displaying only one portion on the display device;

receiving a first indication to select an adjacent portion in the same row as the displayed portion;

in response to receiving the first indication, displaying only the selected adjacent portion on the display device;

receiving a second indication to select an adjacent portion in the same column as the displayed portion; and in response to receiving the first indication, displaying only the selected adjacent portion on the display device.

7. A method as in claim 6 further comprising the steps of:

receiving third indication to select a portion from an adjacent row and an adjacent column as the displayed portion; and in response to receiving the third indication, displaying only the selected portion on the display device.

8. A method in a computer system for previewing on a display device a plurality of pages to be printed by a printer, each page to be printed on a single sheet of paper, each page having data that is vertically adjacent to data of another page and that is horizontally adjacent to data of another page, comprising:

displaying a representation of one of the plurality of the pages on the display device;

displaying a visual indication of the horizontal direction and a visual indication of the vertical direction;

detecting selection of a displayed indication;

when the visual indication of the horizontal direction is selected, selecting a page with data that is horizontally adjacent to the data of the displayed page;

when the visual indication of the vertical direction is selected, selecting a page with data that is vertically adjacent to the data of the displayed page; and displaying a representation of the selected page on the displayed device whereby a user can preview the pages by selecting the displayed indications to individually display each of the pages.

9. The method of claim 8 wherein the visual indication of the horizontal direction is a horizontally aligned arrow and the visual indication of the vertical direction is a vertically aligned arrow.

10. The method of claim 8 wherein the visual indication of the horizontal direction includes a visual indication of left and right and the visual indication of the vertical direction includes a visual indication of up and down.

11. The method of claim 10 including disabling a visual indication when no pages are adjacent to the displayed page in the direction of the visual indication.

12. The method of claim 8 including displaying a visual indication of a diagonal direction and when the visual indication of the diagonal direction is selected, selecting a page with data that is both horizontally and vertically adjacent to the data of the displayed page.

13. A method in a computer system for previewing on a display device a plurality of pages, each page having data that is vertically adjacent to data of another page and that is horizontally adjacent to data of another page, comprising:

displaying a representation of one of the plurality of the pages on the display device;

receiving an indication of a direction;

when the received indication is the horizontal direction, selecting a page with data that is horizontally adjacent to the data of the displayed page;

when the received indication is the vertical direction, selecting a page with data that is vertically adjacent to the data of the displayed page; and displaying a representation of the selected page on the displayed device whereby a user can preview the pages by indicating a direction to individually display each of the pages.

14. The method of claim 13 including displaying a visual indication of the horizontal direction and a visual indication of the vertical direction, and wherein the receiving includes detecting selection of a displayed indication.

15. The method of claim 14 wherein the visual indication of the horizontal direction is a horizontally aligned arrow and the visual indication of the vertical direction is a vertically aligned arrow.

16. The method of claim 14 wherein the visual indication of the horizontal direction includes a visual indication of left and right and the visual indication of the vertical direction includes a visual indication of up and down.

17. The method of claim 16 including the step of disabling a visual indication when no elements are adjacent to the displayed element in the direction of the visual indication.

18. A computer-readable medium containing instructions for causing a computer system to effect the previewing on a display device of a plurality of elements each to be rendered on a single page of a printer, each element having data that is vertically adjacent to data of another element and that is horizontally adjacent to data of another element, by:

displaying a representation of one of the plurality of the elements on the display device;

displaying a visual indication of the horizontal direction and a visual indication of the vertical direction;

detecting selection of a displayed indication;

when the visual indication of the horizontal direction is selected, selecting an element with data that is horizontally adjacent to the data of the displayed element;

when the visual indication of the vertical direction is selected, selecting an element with data that is vertically adjacent to the data of the displayed element; and displaying a representation of the selected element on the displayed device whereby by a user can preview the elements by selecting the displayed indications to individually display each of the elements.

19. The computer-readable medium of claim 18 wherein the visual indication of the horizontal direction is a horizontally aligned arrow and the visual indication of the vertical direction is a vertically aligned arrow.

20. The computer-readable medium of claim 18 wherein the visual indication of the horizontal direction includes a visual indication of left and right and the visual indication of the vertical direction includes a visual indication of up and down.

21. The computer-readable medium of claim 20 containing instructions for disabling a visual indication when no elements are adjacent to the displayed element in the direction of the visual indication.

22. A computer system for previewing on a display device a plurality of pages to be printed by a printer, each page to be printed on a single sheet of paper, each page having data that is vertically adjacent to data of another page and that is horizontally adjacent to data of another page, comprising:

means for displaying a representation of one of the plurality of the pages on the display device;

means for displaying a visual indication of the horizontal direction and a visual indication of the vertical direction;

means for detecting selection of a displayed indication;

means for selecting a page with data that is horizontally adjacent to the data of the displayed page when the visual indication of the horizontal direction is selected;

means for selecting a page with data that is vertically adjacent to the data of the displayed page when the visual indication of the vertical direction is selected; and means for displaying a representation of the selected page on the displayed device whereby by a user can preview the pages by selecting the displayed indications to individually display each of the pages.

23. The computer system of claim 22 wherein the visual indication of the horizontal direction is a horizontally aligned arrow and the visual indication of the vertical direction is a vertically aligned arrow.

24. The computer system of claim 22 wherein the visual indication of the horizontal direction includes a visual indication of left and right and the visual indication of the vertical direction includes a visual indication of up and down.

25. The computer system of claim 24 including means for disabling a visual indication when no pages are adjacent to the displayed page in the direction of the visual indication.

* * * * *